(12) United States Patent
Uchiyama

(10) Patent No.: US 9,094,573 B2
(45) Date of Patent: Jul. 28, 2015

(54) COMMUNICATION SYSTEM, COMMUNICATION METHOD, AND COMPUTER-READABLE STORAGE MEDIUM

(71) Applicant: Hiroaki Uchiyama, Kanagawa (JP)

(72) Inventor: Hiroaki Uchiyama, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 269 days.

(21) Appl. No.: 13/904,492

(22) Filed: May 29, 2013

(65) Prior Publication Data
US 2013/0321556 A1      Dec. 5, 2013

(30) Foreign Application Priority Data

Jun. 1, 2012  (JP) ................. 2012-126271

(51) Int. Cl.
| | |
|---|---|
| *H04N 7/15* | (2006.01) |
| *H04L 12/18* | (2006.01) |
| *H04L 29/06* | (2006.01) |
| *H04M 3/56* | (2006.01) |

(52) U.S. Cl.
CPC .............. *H04N 7/15* (2013.01); *H04L 12/1813* (2013.01); *H04L 65/1046* (2013.01); *H04L 65/403* (2013.01); *H04L 65/4038* (2013.01); *H04M 3/567* (2013.01)

(58) Field of Classification Search
CPC ........... H04N 7/15; H04N 7/152; H04N 7/14; H04N 7/142; H04L 12/1813; H04L 65/4038; H04L 65/1046; H04L 65/403; H04M 3/567
USPC ............. 348/14.01–14.16; 709/204; 370/352, 370/260–261; 715/753
See application file for complete search history.

(56) References Cited

U.S. PATENT DOCUMENTS 7,633,517 B2 * 12/2009 Yim ........................... 348/14.08
8,200,184 B2   6/2012 Hamada et al.
(Continued)

FOREIGN PATENT DOCUMENTS

| | | |
|---|---|---|
| JP | 2002-252839 | 9/2002 |
| JP | 2008-131412 | 6/2008 |
| JP | 2009-267844 | 11/2009 |

(Continued)

*Primary Examiner* — Melur Ramakrishnaiah
(74) *Attorney, Agent, or Firm* — Oblon, McClelland, Maier & Neustadt, L.L.P.

(57) ABSTRACT

A communication system includes a call management server; communication terminals; and a positional information server. The positional information server stores therein positional information and information leakage risk information of each communication terminal, updates the positional information and the information leakage risk information in accordance with a position of the communication terminal, and transmits the updated information together with corresponding communication terminal information to the call management server. The call management server updates the positional information and the information leakage risk information of a communication terminal when receiving the information from the positional information server, and transmits a list containing at least a terminal name, latest positional information, and latest information leakage risk information of each communication terminal capable of joining the communication to a communication terminal. The communication terminal displays the list in a different manner of the positional information in accordance with the information leakage risk information.

8 Claims, 24 Drawing Sheets

(56) References Cited

U.S. PATENT DOCUMENTS

2009/0210700 A1* 8/2009 Nomura et al. ............... 713/155
2012/0140022 A1 6/2012 Kato et al.

FOREIGN PATENT DOCUMENTS

| JP | 2010-044454 | 2/2010 |
|----|-------------|--------|
| JP | 2010-074668 | 4/2010 |

* cited by examiner

FIG.8

BLUETOOTH TERMINAL-POSITION CORRESPONDENCE TABLE
5032

| BLUETOOTH TERMINAL INFORMATION | POSITIONAL INFORMATION | INFORMATION LEAKAGE RISK |
|---|---|---|
| 20001 | TOKYO BUSINESS PLACE, A BUILDING 1F, FIRST CONFERENCE ROOM | RISK IS ABSENT |
| 20002 | TOKYO BUSINESS PLACE, A BUILDING 1F, SECOND CONFERENCE ROOM | RISK IS ABSENT |
| 20003 | TOKYO BUSINESS PLACE, A BUILDING 1F, MAIN ROOM WEST | RISK IS ABSENT |
| 20004 | TOKYO BUSINESS PLACE, A BUILDING 1F, MAIN ROOM CENTER | RISK IS ABSENT |
| 20005 | TOKYO BUSINESS PLACE, A BUILDING 1F, MAIN ROOM EAST | RISK IS ABSENT |
| 20006 | SHIZUOKA BUSINESS PLACE, A BUILDING 1F, FIRST RECEPTION ROOM | RISK IS PRESENT |
| ⋮ | ⋮ | ⋮ |

FIG.9

WIRELESS LAN ACCESS POINT-POSITION CORRESPONDENCE TABLE
5034

| WIRELESS LAN ACCESS POINT INFORMATION | POSITIONAL INFORMATION | INFORMATION LEAKAGE RISK |
|---|---|---|
| 30001 | TOKYO BUSINESS PLACE, A BUILDING 1F | RISK IS ABSENT |
| 30002 | TOKYO BUSINESS PLACE, A BUILDING 1F | RISK IS ABSENT |
| 30003 | TOKYO BUSINESS PLACE, A BUILDING 1F | RISK IS ABSENT |
| 30004 | TOKYO BUSINESS PLACE, A BUILDING 1F | RISK IS ABSENT |
| 30005 | TOKYO BUSINESS PLACE, A BUILDING 2F | RISK IS ABSENT |
| 30006 | SHIZUOKA BUSINESS PLACE, A BUILDING 1F | RISK IS PRESENT |
| ⋮ | ⋮ | ⋮ |

FIG. 10

CALL TERMINAL POSITIONAL INFORMATION TABLE 5036

| CALL TERMINAL INFORMATION | POSITIONAL INFORMATION | | | | | | |
|---|---|---|---|---|---|---|---|
| | OWN TERMINAL POSITIONAL INFORMATION | LEAKAGE RISK | BLUETOOTH TERMINAL POSITIONAL INFORMATION | LEAKAGE RISK | WIRELESS LAN ACCESS POINT POSITIONAL INFORMATION | LEAKAGE RISK | GPS POSITIONAL INFORMATION | LEAKAGE RISK |
| 10001 | TOKYO BUSINESS PLACE A, BUILDING 1F, MAIN ROOM | RISK IS ABSENT | - | - | - | - | - | - |
| 10002 | - | - | - | - | TOKYO BUSINESS PLACE A, BUILDING 1F | RISK IS ABSENT | - | - |
| 10003 | - | - | - | - | TOKYO BUSINESS PLACE A, BUILDING 2F | RISK IS ABSENT | - | - |
| 10004 | - | - | SHIZUOKA BUSINESS PLACE A, BUILDING 1F, FIRST RECEPTION ROOM | RISK IS PRESENT | SHIZUOKA BUSINESS PLACE A, BUILDING 1F | RISK IS PRESENT | - | - |
| 10005 | - | - | - | - | - | - | FUJI CITY, SHIZUOKA | RISK IS PRESENT |
| ... | ... | ... | ... | ... | ... | ... | ... | ... |

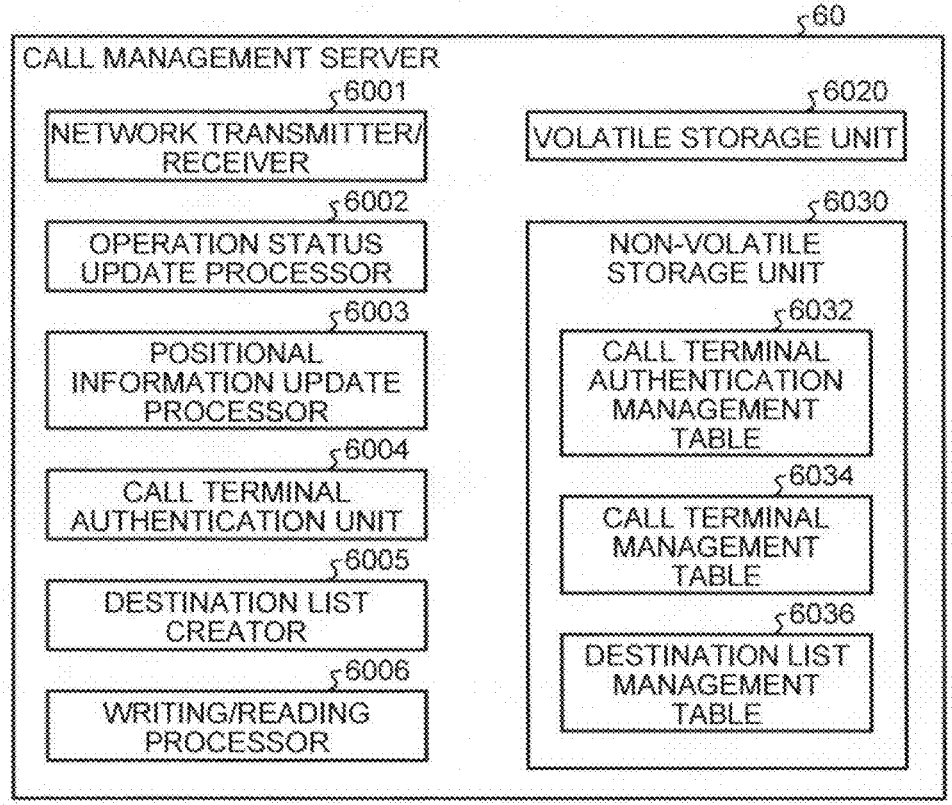

FIG.14

CALL TERMINAL MANAGEMENT TABLE 6034

| CALL TERMINAL INFORMATION | TERMINAL NAME | OPERATION STATE | POSITIONAL INFORMATION | LEAKAGE RISK | TERMINAL IP ADDRESS |
|---|---|---|---|---|---|
| 10001 | TOKYO BUSINESS PLACE AA TERMINAL | OFF-LINE | TOKYO BUSINESS PLACE, A BUILDING 1F, MAIN ROOM | RISK IS ABSENT | 1.2.1.3 |
| 10002 | TOKYO BUSINESS PLACE AB TERMINAL | ON-LINE (CALL-CAPABLE) | TOKYO BUSINESS PLACE, A BUILDING 1F | RISK IS ABSENT | 1.2.1.4 |
| 10003 | TOKYO BUSINESS PLACE AC TERMINAL | ON-LINE (DURING CALL) | TOKYO BUSINESS PLACE, A BUILDING 2F | RISK IS ABSENT | 1.2.2.3 |
| 10004 | SHIZUOKA BUSINESS PLACE AE TERMINAL | ON-LINE (CALL-CAPABLE) | SHIZUOKA BUSINESS PLACE, A BUILDING 1F, FIRST RECEPTION ROOM | RISK IS PRESENT | 1.2.2.4 |
| 10005 | MOBILE TERMINAL DEVELOPING DIVISION, KATO | ON-LINE (CALL-CAPABLE) | FUJI CITY, SHIZUOKA | RISK IS PRESENT | 1.3.1.3 |
| ... | ... | ... | ... | ... | ... |

FIG.15

DESTINATION LIST MANAGEMENT TABLE
6036

| REQUEST SOURCE CALL TERMINAL INFORMATION | DESTINATION CALL TERMINAL INFORMATION |
|---|---|
| 10001 | 10002, 10003, 10004, ⋯ |
| 10002 | 10002, 10003, 10005, ⋯ |
| 10003 | 10001, 10002, 10004, ⋯ |
| 10004 | 10002, 10003, 10005, ⋯ |
| 10005 | 10002, 10004, 10007, ⋯ |
| ⋮ | ⋮ |

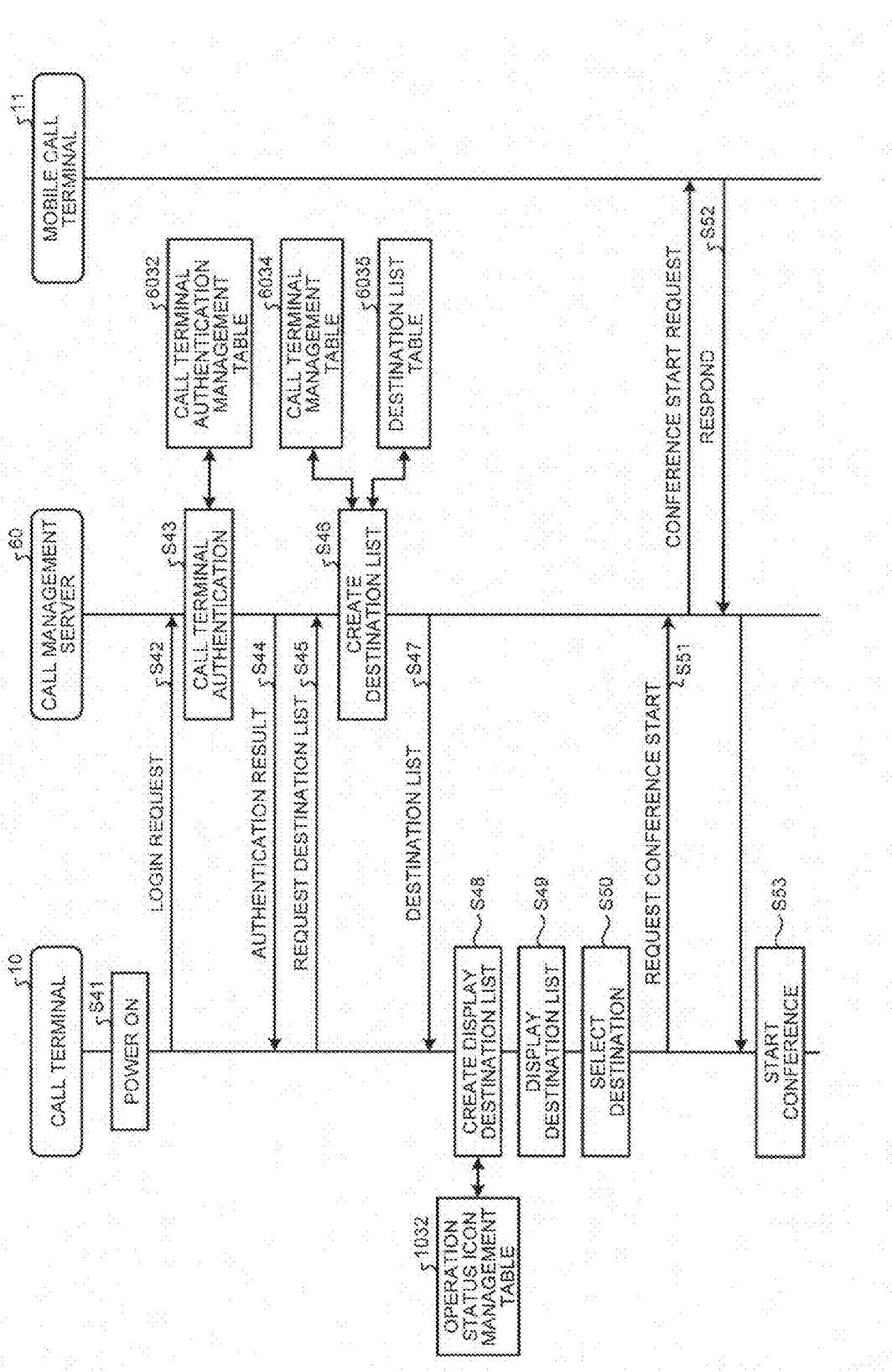

FIG.27

| 151 | 152 | 153 | 154 |

DESTINATION LIST

- TOKYO BUSINESS PLACE
  AB TERMINAL

- MOBILE TERMINAL,
  SUZUKI, SALES DIVISION | TOKYO BUSINESS PLACE, B BUILDING 5F

- MOBILE TERMINAL,
  YAMAMOTO, SALES DIVISION | OUTDOOR, ROPPONGI, MINATO-KU, TOKYO

- SHIZUOKA BUSINESS PLACE
  AE TERMINAL | SHIZUOKA BUSINESS PLACE, A BUILDING, FIRST CONFERENCE ROOM

- MOBILE TERMINAL,
  KATO, DEVELOPING DIVISION | OUTDOOR, FUJI CITY, SHIZUOKA

- MOBILE TERMINAL,
  SHARED, SALES DIVISION | OUTDOOR, YOKOHAMA CITY, KANAGAWA

COMMUNICATION SYSTEM, COMMUNICATION METHOD, AND COMPUTER-READABLE STORAGE MEDIUM

CROSS-REFERENCE TO RELATED APPLICATION

The present application claims priority to and incorporates by reference the entire contents of Japanese Patent Application No. 2012-126271 filed in Japan on Jun. 1, 2012.

BACKGROUND OF THE INVENTION

1. Field of the Invention

The present invention relates to a communication system, a communication method, and a computer-readable storage medium.

2. Description of the Related Art

In recent years, communication systems using communication network such as the Internet have been widespread as represented by a video conversation system and a web conference system. Furthermore, widespread have been mobile call terminals that make it possible to perform video phone as communication terminals, so that a video-conference and the like using the mobile call terminals can be performed. This enables users to have a conference and the like through the communication network anytime anywhere. In accompanied therewith, there arises a problem that security cannot be kept depending on environments around the users who have the video-conference and the like.

As a conventional technique, known have been techniques with which a transmitter has a conference with parties with audio only, transmits an image only to the parties, and transmits an image while deleting a background image depending on an environmental condition of the transmitter (for example, Japanese Patent Application Laid-open No. 2008-131412).

The conventional techniques do not take environments around the parties into consideration. This arises a problem that the video-conference and the like are started even when the user does not desire to have the video-conference and the like with a party at a public place, for example, for the security reason, and the user notices the situation of the party (where the party is at the public place and so on) later.

Therefore, there is a need for a system capable of determining whether a user as a communication source starts communication with another user as a communication destination based on a situation of a communication terminal of the user as the communication destination using communication network.

SUMMARY OF THE INVENTION

It is an object of the present invention to at least partially solve the problems in the conventional technology.

According to an embodiment, there is provided a communication system that includes a call management server connected to a communication network; a plurality of communication terminals configured to make communication with one another through the call management server, the communication terminals being connected to the communication network; and a positional information server connected to the communication network. The positional information server includes a terminal positional information storage unit configured to store therein positional information and information leakage risk information of each of the communication terminals, updates the positional information and the information leakage risk information of a communication terminal stored in the terminal positional information storage unit in accordance with a position of the communication terminal, and transmits the updated latest positional information and the updated latest information leakage risk information together with corresponding communication terminal information to the call management server. The call management server includes a destination list storage unit configured to store therein a list of communication terminals capable of joining communication for each of the communication terminals and a terminal status storage unit configured to store therein at least a terminal name, latest positional information, and latest information leakage risk information of each of the communication terminals, updates the positional information and the information leakage risk information of a corresponding communication terminal stored in the terminal status storage unit when receiving the positional information and the information leakage risk information together with the communication terminal information from the positional information server, and transmits the list containing at least the terminal name, the latest positional information, and the latest information leakage risk information of each of the communication terminals capable of joining the communication to a communication terminal as a communication source based on the destination list storage unit and the terminal status storage unit when receiving a list request from the communication terminal as the communication source. The communication terminal as the communication source displays the list received from the call management server in a different display manner of the positional information in accordance with the information leakage risk information.

According to another embodiment, there is provided a communication method implemented in a communication system that includes a call management server connected to a communication network, a plurality of communication terminals configured to make communication with one another through the call management server, the communication terminals being connected to the communication network, and a positional information server connected to the communication network. The communication method includes updating positional information and information leakage risk information of a communication terminal stored in a terminal positional information storage unit of the positional information storage unit in accordance with a position of the communication terminal; transmitting the updated latest positional information and the updated latest information leakage risk information together with corresponding communication terminal information to the call management server; updating the positional information and the information leakage risk information of the communication terminal stored in a terminal status storage unit of the call management server when receiving the positional information and the information leakage risk information together with the communication terminal information from the positional information server; transmitting a list containing at least the terminal name, the latest positional information, and the latest information leakage risk information of each of the communication terminals capable of joining communication to a communication terminal as a communication source when receiving a list request from the communication terminal as the communication source; and displaying, in the communication terminal as the communication source, the received list in a different display manner of the positional information in accordance with the information leakage risk information.

According to still another embodiment, there is provided a non-transitory computer-readable storage medium with an executable program stored thereon and executed by a computer of a communication system that includes a call management server connected to a communication network, a plurality of communication terminals configured to make communication with one another through the call management server, the communication terminals being connected to the communication network, and a positional information server connected to the communication network. The program instructs the computer to perform updating positional information and information leakage risk information of a communication terminal stored in a terminal positional information storage unit of the positional information in accordance with a position of the communication terminal; transmitting the updated latest positional information and the updated latest information leakage risk information together with corresponding communication terminal information to the call management server; updating the positional information and the information leakage risk information of the communication terminal stored in a terminal status storage unit of the call management server when receiving the positional information and the information leakage risk information together with the communication terminal information from the positional information server; transmitting a list containing at least the terminal name, the latest positional information, and the latest information leakage risk information of each of the communication terminals capable of joining communication to a communication terminal as a communication source when receiving a list request from the communication terminal as the communication source; and displaying, in the communication terminal as the communication source, the received list in a different display manner of the positional information in accordance with the information leakage risk information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a view illustrating a configuration example of a Bluetooth terminal information/position correspondence table;

FIG. 9 is a view illustrating a configuration example of a wireless LAN access point-position correspondence table;

FIG. 10 is a view illustrating a configuration example of a call terminal positional information table;

FIG. 12 is a functional block diagram illustrating the call management server according to the embodiment;

FIG. 13 is a view illustrating a configuration example of a call terminal authentication management table;

FIG. 14 is a view illustrating a configuration example of a call terminal management table;

FIG. 15 is a view illustrating a configuration example of a destination list management table;

FIG. 26 is an operation sequence diagram when the call terminal and the call management server start a video-conference;

FIG. 27 is a view illustrating an example of destination list display on a call terminal as a communication source;

DETAILED DESCRIPTION OF THE PREFERRED EMBODIMENTS

Hereinafter, one embodiment of the invention is described with reference to the drawings. While the following describes a video-conference system as an example of a communication system, the invention is not limited to video-conference systems.

Figure 1:
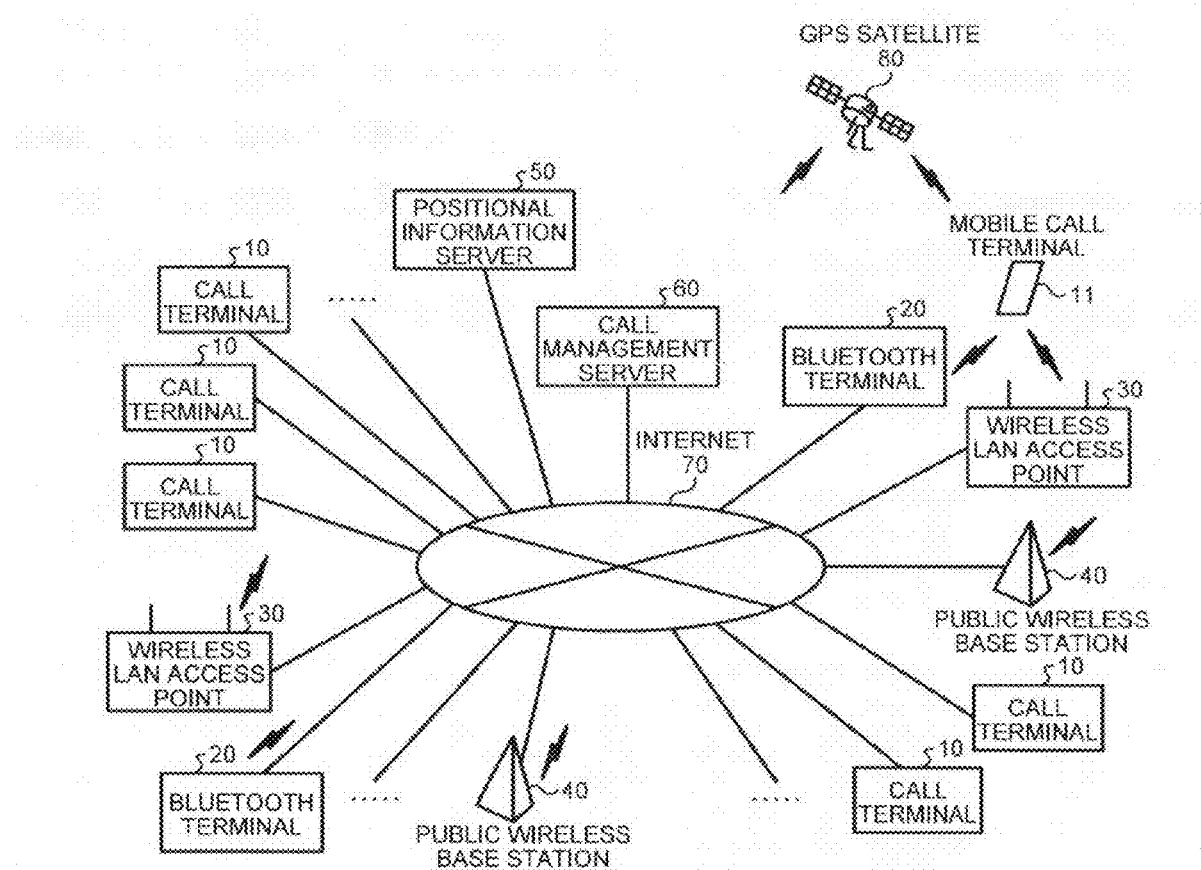
FIG. 1 is an overall configuration view illustrating a communication system (video-conference system) according to an embodiment of the invention.

FIG. 1 is an overall configuration view illustrating the video-conference system as the communication system according to an embodiment. The video-conference system is constructed by a large number of call terminals 10 as communication terminals, a large number of mobile call terminals 11 (only one mobile call terminal 11 is illustrated in FIG. 1 for convenience) as communication terminals, a large number of Bluetooth (registered trademark) terminals 20, a large number of wireless LAN access points 30, a large number of public wireless base stations 40, a positional information server 50, a call management server 60, and the Internet 70 as communication networks that connect the respective devices. It is to be noted that a reference numeral 80 denotes a GPS satellite.

The call terminal 10 and the mobile call terminal 11 are terminals that can have a video-conference with other call terminals and mobile call terminals through the Internet 70. The call terminal 10 is a terminal of a type that is used indoors and can be connected to the Internet 70 through a wired LAN directly. The call terminal 10 may be configured as a portable call terminal (for example, the RICOH Unified Communication System P3000). In this case, the call terminal 10 can be connected to the Internet 70 through the wireless LAN access point 30 or the like. The mobile call terminal 11 is a mobile terminal that is used both indoors and outdoors and can be connected to the Internet 70 through the wireless LAN access point 30 or the public wireless base station 40. The call terminal 10 and the mobile call terminal 11 receive GPS satellite waves from the GPS satellite 80 so as to acquire positional information.

The Bluetooth terminal 20 is a terminal for searching the call terminals 10 or the mobile call terminals 11 around it periodically by using a Bluetooth searching function. The Bluetooth terminal 20 can search the call terminal 10 or the mobile call terminal 11 with Bluetooth communication when the call terminal 10 or the mobile call terminal 11 is present in an area within approximately 10 m around the Bluetooth terminal 20, for example. As a result of the search, information of the call terminal 10 or the mobile call terminal 11 that has been found is transmitted to the positional information server 50 through the Internet 70 with the Bluetooth terminal 20. The Bluetooth terminals 20 are installed at a constant interval in conference rooms, main rooms, and the like in an office, for example.

The wireless LAN access point 30 is installed for connecting the call terminal 10 or the mobile call terminal 11 to the Internet 70. For example, the wireless LAN access point 30 includes a public wireless LAN access point installed outdoors, and a wireless LAN access point in a company or the like that is installed indoors. The public wireless base station 40 is installed for connecting the mobile call terminal 11 to the Internet 70. For example, the public wireless base station 40 includes a WiMAX (registered trademark) wireless base station and a mobile phone base station.

Figure 2:
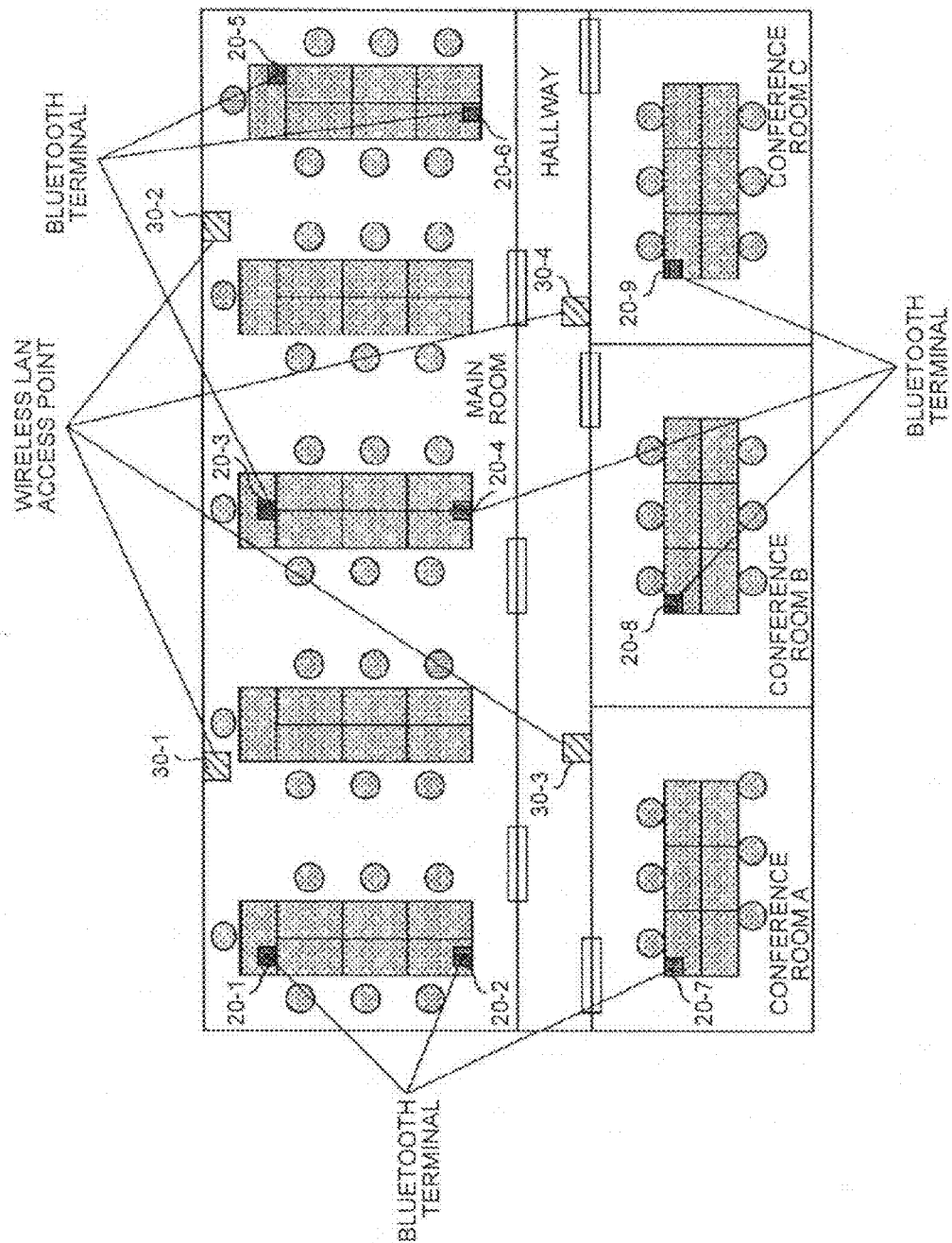
FIG. 2 is a view illustrating an installation example of Bluetooth terminals and wireless local area network (LAN) access points.

FIG. 2 illustrates an installation example of the Bluetooth terminals 20 and the wireless LAN access points 30. FIG. 2 illustrates an example in which the Bluetooth terminals 20 and the wireless LAN access points 30 are installed in the company (business place). Reference numerals 20-1 to 20-9 indicate the Bluetooth terminals and reference numerals 30-1 to 30-4 indicate the wireless LAN access points.

Returning to FIG. 1, the positional information server 50 manages positional information of the respective call terminals 10 and the respective mobile call terminals 11. The positional information managed by the positional information server 50 includes information indicating presence and absence of an information leakage risk (risk is high/low) (information leakage risk information) for the call terminals. The positional information is updated in real time so as to correspond to the positions of the call terminals. The positional information server 50 transmits the latest (current) positional information of the respective call terminals 10 and the respective mobile call terminals 11 together with the information leakage risk information thereof to the call management server 60 through the Internet 70.

The call management server 60 manages the terminal names, the call statuses (operation statuses), the latest positional information, the information leakage risk information, the destination lists, and the like of the respective call terminals 10 and the respective mobile call terminals 11.

When a video-conference is held, the call management server 60 transmits the terminal names, the operation statuses, the positional information, the information leakage risk information, and the like of respective call terminals as communication destinations as a destination list of the call terminals and the mobile call terminals as the communication destinations to a call terminal as a communication source. The call terminal as the communication source displays the terminal names, the operation statuses, the positional information, and the like of the respective call terminals as the communication destinations that have been transmitted from the call management server 60. In this case, the call terminal as the communication source displays the positional information in shaded and color-coded manners based on the information leakage risk information. This enables a user of the call terminal as the communication source to known whether the call terminals and the mobile call terminals of communication parties are present in environments where security can be kept.

Next, described are configurations of main devices constructing the video-conference system according to the embodiment.

Figure 3:
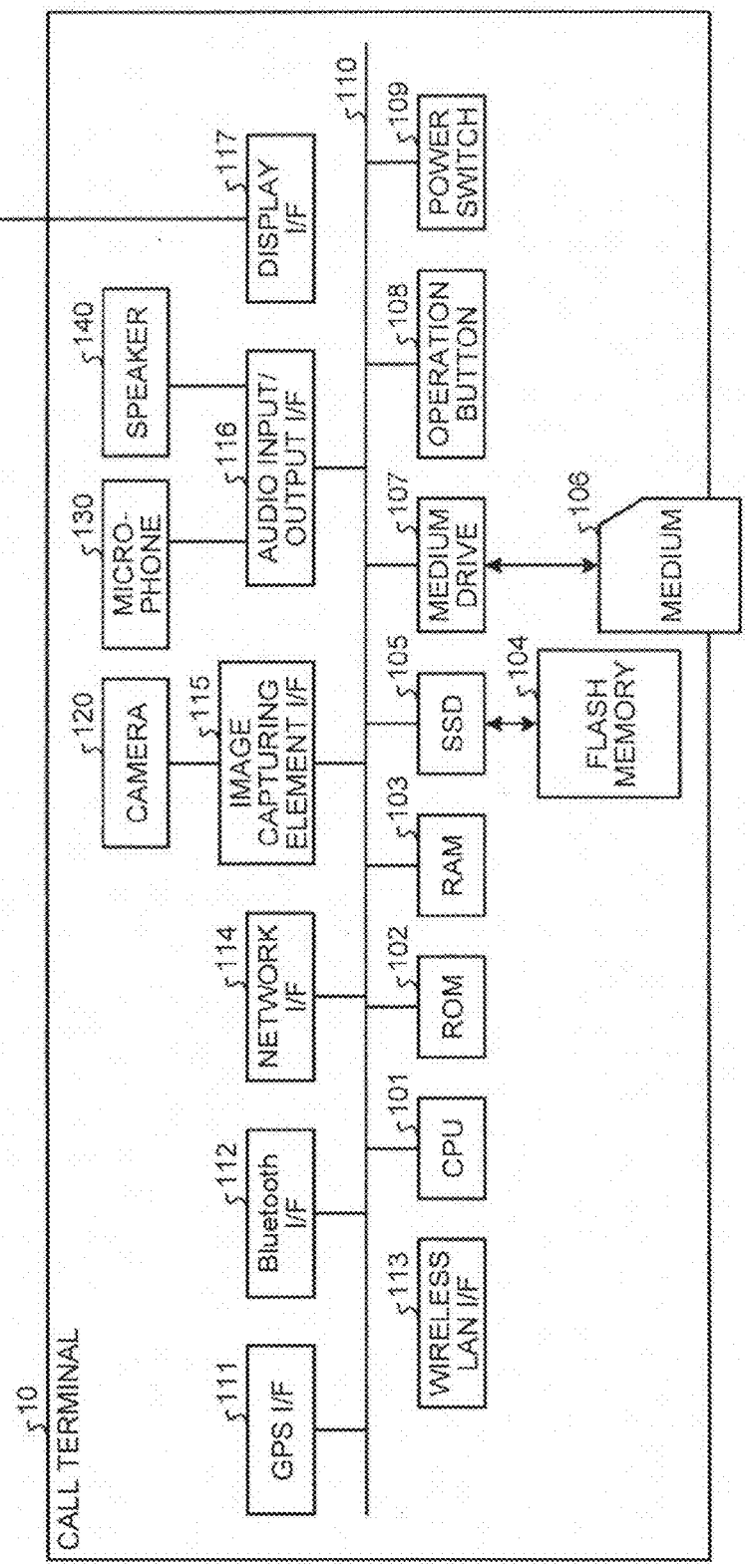
FIG. 3 is a diagram illustrating a hardware configuration of a call terminal according to the embodiment.

FIG. 3 is a diagram illustrating a hardware configuration of the call terminal 10 according to the embodiment. The call terminal 10 is configured as a portable call terminal (for example, the RICOH Unified Communication System P3000). It is to be noted that only the size and the shape of the mobile call terminal 11 differ from those of the call terminal 10 and the internal functional configuration thereof is the same as that of the call terminal 10.

In FIG. 3, the call terminal 10 includes a central processing unit (CPU) 101, a read only memory (ROM) 102, a random access memory (RAM) 103, a flash memory 104, a solid state drive (SSD) 105, a medium drive 107, various types of operation buttons 108, a power switch 109, various types of interface (I/F) circuits 111 to 117, and an internal bus 110. The CPU 101 controls operations of the call terminal overall and executes processing. The ROM 102 stores programs such as an initial program loader (IPL) to be used for driving the CPU 101. The RAM 103 is used as an operation memory of the CPU 101. The flash memory 104 stores programs to be executed on the CPU 101 and various types of data, tables, and the like. The SSD 105 controls reading/writing of the programs and various types of data from/into the flash memory 104. The medium drive 107 controls reading/writing of data and the like from/into an external storage medium 106. The internal bus 110 connects the above-mentioned parts. It is to be noted that the flash memory 104 and the SSD 105 may be replaced by a hard disk (HDD) and a driver thereof.

Furthermore, the call terminal 10 incorporates a camera 120, a microphone 130, and a speaker 140. A display (display device) 150 is provided externally. It is to be noted that the display 150 may be configured to be integrated with the call terminal 10. Note that the mobile call terminal 11 has the same configuration. The camera 120 is connected to the image capturing element I/F 115 and the microphone 130 and the speaker 140 are connected to the audio input/output I/F 116. The display 150 is connected to the display I/F 117.

Figure 4:
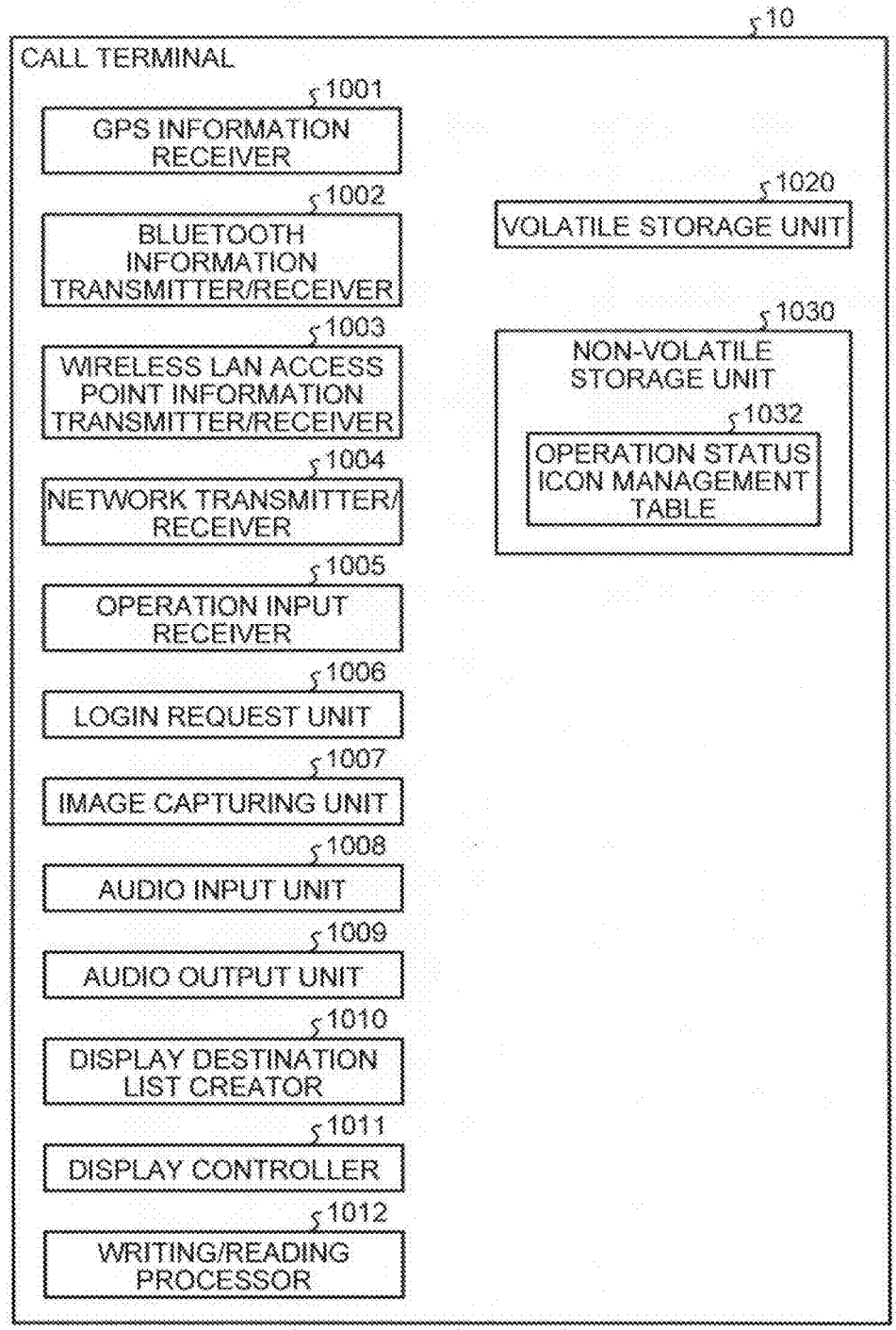
FIG. 4 is a functional block diagram illustrating the call terminal according to the embodiment.

FIG. 4 is a functional block diagram illustrating the call terminal 10 according to the embodiment. The call terminal 10 includes a GPS information transmitter/receiver 1001, a Bluetooth information transmitter/receiver 1002, a wireless LAN access point information transmitter/receiver 1003, a network transmitter/receiver 1004, an operation input receiver 1005, a login request unit 1006, an image capturing unit 1007, an audio input unit 1008, an audio output unit 1009, a display destination list creator 1010, a display controller 1011, and a writing/reading processor 1012. The respective parts are functions or units that are made to operate by the constituent elements as illustrated in FIG. 3 and by executing programs loaded on the RAM 103 from the flash memory 104 on the CPU 101.

In addition, the call terminal 10 includes a volatile storage unit 1020 constructed by the RAM 103 as illustrated in FIG. 3 and a non-volatile storage unit 1030 constructed by the flash memory 104 as illustrated in FIG. 3. The non-volatile storage unit 1030 holds an operation status icon management table 1032.

Figures 5, 6:
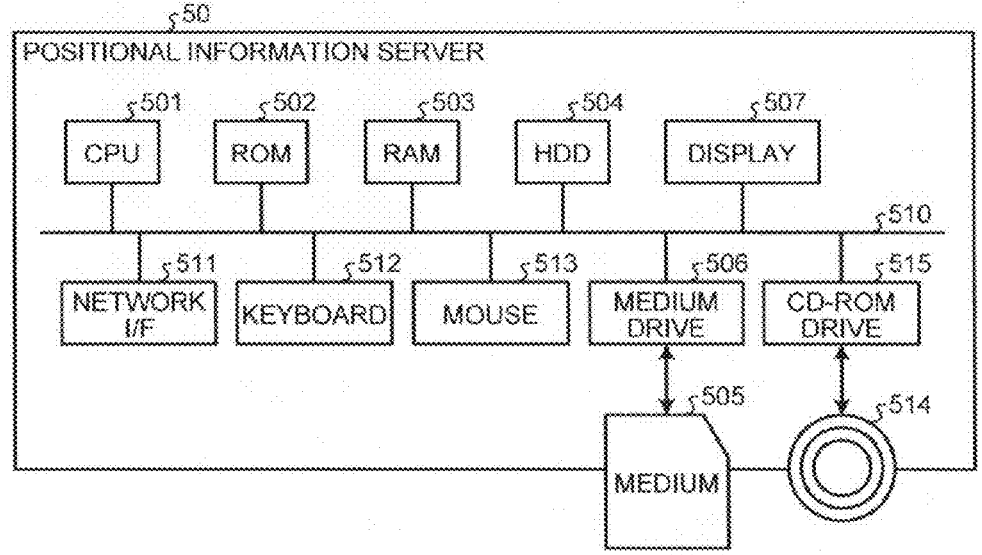
FIG. 5 is a view illustrating a configuration example of an operation status icon management table.
FIG. 6 is a diagram illustrating a hardware configuration of a positional information server according to the embodiment.

FIG. 5 illustrates an example of the operation status icon management table 1032. On the operation status icon management table 1032, image data of operation status icons to be displayed on the display 150 are managed for operation status information indicating operation statuses of the call terminals 10 and the mobile call terminals 11 as candidates of destination call terminals in a correspondence manner. FIG. 5 illustrates the case where the operation status of the candidate of the destination call terminal is on-line (call-capable), the case where the operation status thereof is on-line (during call, malfunction), the case where the operation status is on-line (during call, normal), and the case where the operation status is off-line from top down.

The operation status of the "on-line (call-capable)" indicates the state where the candidate of the destination call terminal is on-line and does not start a call. The operation status of the "on-line (during call, malfunction)" indicates the state where the candidate of the destination call terminal is during the call (during the conference) with another call terminal but the conversation is inhibited due to malfunction of a function relating to the conversation. The malfunction of the function relating to the conversation includes malfunction of a microphone, a speaker, or the like. In this case, even if the user joins the video-conference with the destination call terminal, the conference cannot be held smoothly due to the malfunction. The operation status of the "on-line (during call, normal)" indicates the state where the candidate of the destination call terminal is during call with another call terminal but the conversation is inhibited due to execution of a function relating to the conversation, and the candidate of the destination call terminal normally operates functionally. The function relating to the conversation includes input mute of the microphone and output mute of the speaker. In this case, even if the user joins the video-conference with the destination call terminal, the user can have smooth conversation with the destination call terminal as long as the function such as the input mute of the microphone and the output mute of the speaker is cancelled. The operation status of the "off-line" indicates the state where the candidate of the destination call terminal is off-line.

Next, described are the respective functional configurations and operations of the call terminal 10 with reference to FIG. 3 and FIG. 4.

The GPS information transmitter/receiver 1001 is made to operate with the GPS I/F 111 and acquires positional information (GPS information) from the GPS satellite 80 periodically under control by the CPU 101. The acquired GPS information together with information of the call terminal 10 are transmitted to the positional information server 50 from the network transmitter/receiver 1004.

The Bluetooth information transmitter/receiver 1002 is made to operate with the Bluetooth I/F 112 and makes Bluetooth-communication with the Bluetooth terminal 20 under control by the CPU 101. As described above, the Bluetooth terminal 20 can search the call terminal 10 with the Bluetooth communication when the call terminal 10 is present in an area within approximately 10 m around the Bluetooth terminal 20, for example. The information of the found call terminal 10 together with the information of the Bluetooth terminal 20 are transmitted to the positional information server 50 from the Bluetooth terminal 20.

The wireless LAN access point information transmitter/receiver 1003 is made to operate with the wireless LAN I/F 113 and communicates with the wireless LAN access point 30 so as to acquire information of the wireless LAN access point 30 under control by the CPU 101. The acquired information of the wireless LAN access point 30 together with the information of the call terminal 10 are transmitted to the positional information server 50 from the network transmitter/receiver 1004.

The network transmitter/receiver 1004 is made to operate with the network I/F 114 and transmits and receives various pieces of information to/from the positional information server 50, the call management server 60, or other call terminals 10 or other mobile call terminals 11 through the Internet (communication network) 70 directly or via the wireless LAN access point 30 under control by the CPU 101.

When the call terminal 10 has a video-conference with other call terminals 10 or other mobile call terminals 11, the network transmitter/receiver 1004 receives destination list information of the call terminals as the communication destinations from the call management server 60. The destination list information includes terminal names, operation status information, positional information, information leakage risk information, and IP addresses, and the like of the respective call terminals as the communication destinations.

The operation input receiver 1005 is made to operate with the operation buttons 108 and the power switch 109 and receives various types of operation inputs from a user. For example, if the user turns ON the power switch 109, the operation input receiver 1005 receives the turning-ON and turns ON the power supply.

The login request unit 1006 is made to operate with the processing of the CPU 101 and transmits login request information indicating a request for login, an IP address of the call terminal as the request source, and the like to the call management server 60 through the Internet 70 from the network transmitter/receiver 1004 upon the reception of the turning-ON. It is to be noted that if the user switches the power switch 109 to the OFF state from the ON state, the network transmitter/receiver 1004 transmits the status information indicating that the power supply is to be turned OFF to the call management server 60, and then, the operation input receiver 1005 turns OFF the power supply completely. This enables the call management server 60 to recognize that the call terminal 10 has been switched to the OFF state from the ON state.

The image capturing unit 1007 is made to operate with the camera 120 and the image capturing element I/F 115, image-captures a subject under control by the CPU 101, and outputs image data obtained by the image capturing.

The audio input unit 1008 is made to operate with the microphone 130 and the audio input/output I/F 116 and inputs audio data relating to an audio signal after audio of the user has been converted to the audio signal with the microphone 130 under control by the CPU 101. The audio output unit 1009 is made to operate with the speaker 140 and the audio input/output I/F 116, outputs an audio signal relating to audio data of itself or a party to the speaker 140 and causes the speaker 140 to output the audio under control by the CPU 101.

The display destination list creator 1010 is made to operate with the processing of the CPU 101 and creates a destination list to be displayed on the display 150 based on the destination list information received from the call management server 60 when the call terminal 10 has a video-conference with other call terminals 10 or other mobile call terminals 11. At this time, corresponding operation status icons are assigned to the operation statuses of the respective call terminals as the communication destinations by referring to the operation status icon management table 1032 as illustrated in FIG. 5. This makes it possible to recognize the operation statuses of the respective call terminals as the communication destinations with the icons at one view. Furthermore, a display manner of the positional information of the call terminals as the communication destinations is as follows. That is, normal display or blue is assigned to the case where there is no information leakage risk, and shaded display or red is assigned to the case where there is an information leakage risk based on the information leakage risk information, for example. This makes it possible to recognize whether there is a problem on surrounding environments of the respective call terminals as the communication destinations in terms of security at one view in the same manner.

The display controller 1011 is made to operate with the display I/F 117 and controls to display various pieces of information on the display 150 under control by the CPU 101. To be more specific, when the call terminal 10 has a video-conference with other call terminals 10 or other mobile call terminals 11, the display controller 1011 controls to display the destination list created by the display destination list creator 1010 on the display 150. In this case, the operation statuses of the respective call terminals are displayed with the corresponding operation status icons and the information leakage risk presence/absence statuses thereof are displayed in the shaded or color-coded manner.

The writing/reading processor 1012 is made to operate with the processing of the CPU 101 and the SSD 105 and performs writing/reading processing of various pieces of information into/from the volatile storage unit 1020 and the non-volatile storage unit 1030.

FIG. 6 is a diagram illustrating a hardware configuration of the positional information server 50 according to the embodiment. The positional information server 50 includes a CPU 501, a ROM 502, a RAM 503, a hard disk (HDD) 504, a medium drive 506, a display 507, a network I/F 511, a keyboard 512, a mouse 513, a compact disc disk-read only memory (CD-ROM) driver 515, and an internal bus 510. The CPU 501 controls the positional information server overall and executes necessary processing. The ROM 502 stores programs such as an initial program loading (IPL) to be used for driving the CPU 501. The RAM 503 is used as an operation memory for the CPU 501. The HDD 504 stores the programs to be executed on the CPU 501, various pieces of data, tables, and the like. The medium drive 506 controls reading/writing of the data and the like from/into an external storage medium 505. The display 507 displays various pieces of information. The network I/F 511 is an interface for performing data transmission by using the Internet (communication network) 70. The keyboard 512 includes a plurality of keys for inputting characters, numerical values, various types of directions, and the like. The mouse 513 performs selection and execution of various types of directions, selection of a processing target, movement of a cursor, and the like on the display 207. The CD-ROM drive 515 controls reading/writing of the data and the like from/into the CD-ROM 514 and the like as a detachable storage medium. The internal bus 510 connects the respective parts.

The programs to be executed on the CPU 501 may be recorded in a computer-readable storage medium such as the external storage medium 505 and the CD-ROM 514 so as to be distributed. Alternatively, the programs may be recorded not in the HDD 504 but in the ROM 502.

Figure 7:
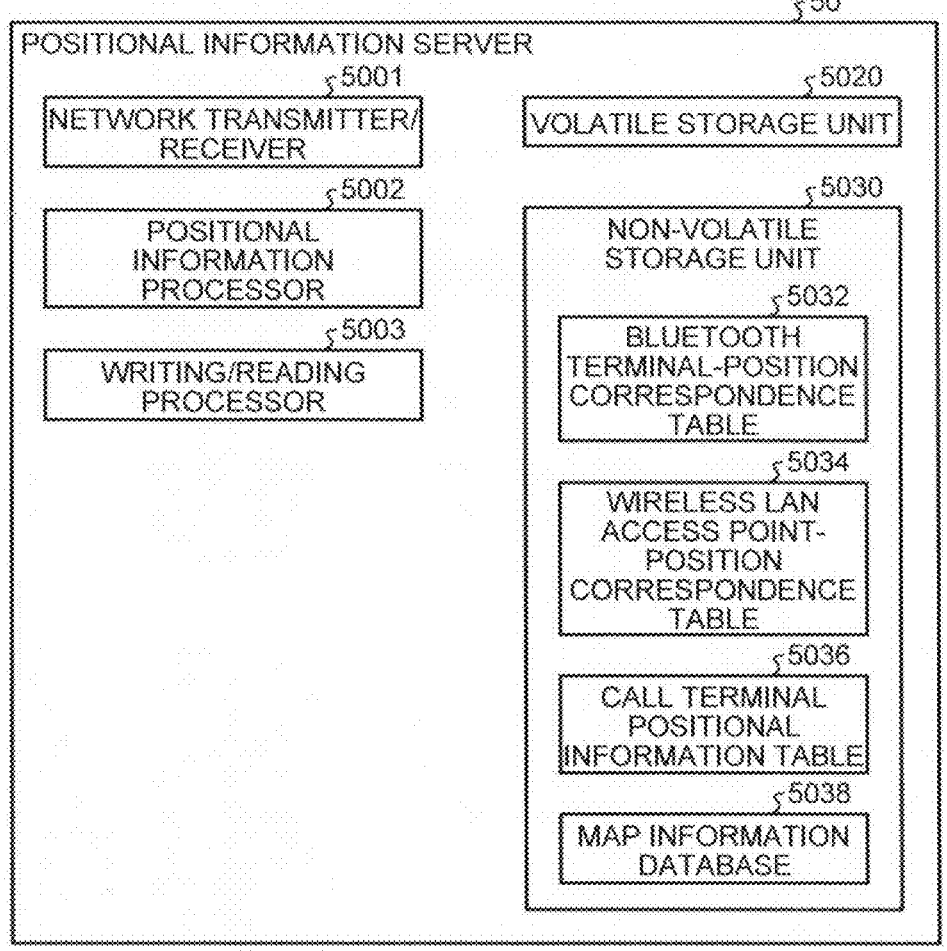
FIG. 7 is a functional block diagram illustrating the positional information server according to the embodiment.

FIG. 7 is a functional block diagram illustrating the positional information server 50 according to the embodiment. The positional information server 50 includes a network transmitter/receiver 5001, a positional information processor 5002, and a writing/reading processor 5003. The respective parts are functions or units that are made to operate by the constituent elements as illustrated in FIG. 6 and by executing programs loaded on the RAM 503 from the HDD 504 on the CPU 501.

In addition, the positional information server 50 includes a volatile storage unit 5020 constructed by the RAM 503 as illustrated in FIG. 6, and a non-volatile storage unit 5030 constructed by the HDD 504, the storage medium 505, or the like as illustrated in FIG. 6. The non-volatile storage unit 5030 (for example, the HDD 504) holds a Bluetooth terminal-position correspondence table 5032, a wireless LAN access point-position correspondence table 5034, a call terminal positional information table 5036, and a map information database 5038.

FIG. 8 to FIG. 10 are views illustrating configurations of the Bluetooth terminal-position correspondence table (Bluetooth terminal-position correspondence storage unit) 5032, the wireless LAN access point-position correspondence table (wireless LAN access point-position correspondence storage unit) 5034, the call terminal positional information table (terminal positional information storage unit) 5036. It is to be noted that an existing database may be used as the map information database 5038 and a specific configuration thereof and the like are omitted.

As illustrated in FIG. 8, the Bluetooth terminal-position correspondence table 5032 manages positional information of Bluetooth terminals and information (information leakage risk information) indicating presence/absence of information leakage risks for the respective Bluetooth terminal information (Bluetooth terminal IDs). As illustrated in FIG. 9, the wireless LAN access point-position correspondence table 5034 manages positional information of wireless LAN access points and information (information leakage risk information) indicating presence/absence of information leakage risks for the respective wireless LAN access point information (access point IDs) in the same manner.

Furthermore, as illustrated in FIG. 10, the call terminal positional information table 5036 manages current (latest) positional information of call terminals for the respective call terminal information (call terminal IDs) of the call terminals 10 and the mobile call terminals 11. The positional information of the call terminal is configured by one or a plurality of the own terminal positional information, the Bluetooth terminal positional information, the wireless LAN access point positional information, and the GPS positional information. The information leakage risk information is added to each piece of positional information.

The own terminal positional information indicates positional information of the call terminal itself. Furthermore, the Bluetooth terminal positional information indicates positional information of a Bluetooth terminal present in the vicinity of the call terminal, and the wireless LAN access point positional information indicates positional information of a wireless LAN access point in the vicinity of the call terminal in the same manner. The GPS positional information indicates positional information of the position of the call terminal that has been acquired from the GPS satellite 80.

That is to say, when the call terminal is installed fixedly in a main room of the user, or the like, it is sufficient that the positional information is set to the own terminal positional information. When the call terminal is a portable terminal or is a mobile terminal having the smaller size, the position of the call terminal is not defined. For this reason, in this case, the positional information of the Bluetooth terminal or the wireless LAN access point present in the vicinity of the call terminal, or the GPS positional information acquired from the GPS satellite is set to the positional information of the call terminal.

In FIG. 10, a call terminal of "10001" is an example of the call terminal that is installed fixedly in the main room of the user, or the like. In addition, call terminals of "10002" to "10005" are examples of the portable call terminals or the mobile call terminals having the smaller size. The call terminals of "10002" and "10003" are examples where the wireless LAN access point is present in the vicinity of the call terminals and the call terminal of "10004" is an example where both the Bluetooth terminal and the wireless LAN access point are present in the vicinity of the call terminal. The call terminal of "10005" is an example where both the Bluetooth terminal and the wireless LAN access point are not present in the vicinity of the call terminal.

The Bluetooth positional information, the wireless LAN access point positional information, and the GPS positional information on the call terminal positional information table 5036 in FIG. 10 are updated in accordance with the positions of the call terminals. This will be described later.

Returning to FIG. 7, described are operations of the processing functions 5001 to 5003 of the positional information server 50.

The network transmitter/receiver 5001 is made to operate with the network I/F 511 in FIG. 6 and transmits and receive various pieces of information to/from the call terminal 10 and the mobile call terminal 11, the Bluetooth terminal 20, and the call management server 60 through the Internet (communication network) 70 under control by the CPU 501. To be more specific, the network transmitter/receiver 5001 receives the own terminal positional information, the GPS information acquired from the GPS satellite 80, or the information of the wireless LAN access point in the vicinity of the call terminal together with the call terminal information from the call terminal 10 or the mobile call terminal 11. Furthermore, the network transmitter/receiver 5001 receives information (call terminal information) of the call terminal 10 or the mobile call terminal 11 in the vicinity of the Bluetooth terminal 20 together with the Bluetooth terminal information from the Bluetooth terminal 20. The network transmitter/receiver 5001 transmits the updated latest positional information (Bluetooth terminal positional information, wireless LAN access point positional information, or GPS positional information) of the call terminal 10 or the mobile call terminal 11 to the call management server 60. The positional information to be transmitted to the call management server 60 includes the information leakage risk information.

The positional information processor 5002 is made to operate with the processing of the CPU 501 in FIG. 6 and performs update processing on the positional information in the call terminal positional information table 5036 by referring to the Bluetooth terminal-position correspondence table 5032, the wireless LAN access point-position correspondence table 5034, and the map information database 5038 through the writing/reading processor 5003. To be more specific, when the positional information processor 5002 has received the call terminal information and the own terminal positional information from the call terminal 10 or the mobile call terminal 11, the positional information processor 5002 registers the own terminal positional information in entry of the corresponding call terminal information on the call terminal positional information table 5036 as it is and sets absence of the information leakage risk as the information leakage risk information. When the positional information processor 5002 has received the call terminal information and the wireless LAN access point information from the call terminal 10 or the mobile call terminal 11, the positional information processor 5002 acquires the positional information and the information leakage risk information corresponding to the wireless LAN access point information from the wireless LAN access point-position correspondence table 5034. Then, the positional information processor 5002 updates the wireless LAN access point positional information and the information leakage risk information in the entry of the corresponding terminal information on the call terminal positional information table 5036. When the positional information processor 5002 has received the call terminal information and the GPS information from the call terminal 10 or the mobile call terminal 11, the positional information processor 5002 converts the GPS information to address information (GPS positional information) by referring to the map information database 5038. Then, the positional information processor 5002 updates the GPS positional information and the information leakage risk information in the entry of the corresponding call terminal information on the call terminal positional information table 5036. Alternatively, when the positional information processor 5002 has received the Bluetooth terminal information and the call terminal information from the Bluetooth terminal 20, the positional information processor 5002 acquires positional information and information leakage risk information corresponding to the Bluetooth terminal information from the Bluetooth terminal-position correspondence table 5032. Then, the positional information processor 5002 updates the Bluetooth terminal positional information and the information leakage risk information in the entry of the corresponding call terminal information on the call terminal positional information table 5036.

Furthermore, the positional information processor 5002 performs processing of transmitting the updated latest positional information and the updated latest information leakage risk information on the call terminal positional information table 5036 together with the corresponding call terminal information to the network transmitter/receiver 5001. In this case, when a plurality pieces of positional information (for example, Bluetooth terminal positional information and GPS positional information) for the corresponding call terminal information are present on the call terminal positional information table 5036, the positional information processor 5002 selects positional information with high accuracy and transmits it to the network transmitter/receiver 5001. The detail processing thereof will be described later.

The writing/reading processor 1012 is made to operate with the processing of the CPU 501, the medium drive 506 and the like in FIG. 6 and performs writing/reading processing of various pieces of information into/from the volatile storage unit 5020 and the non-volatile storage unit 5030 for the network transmitter/receiver 5001 and the positional information processor 5002.

Figure 11:
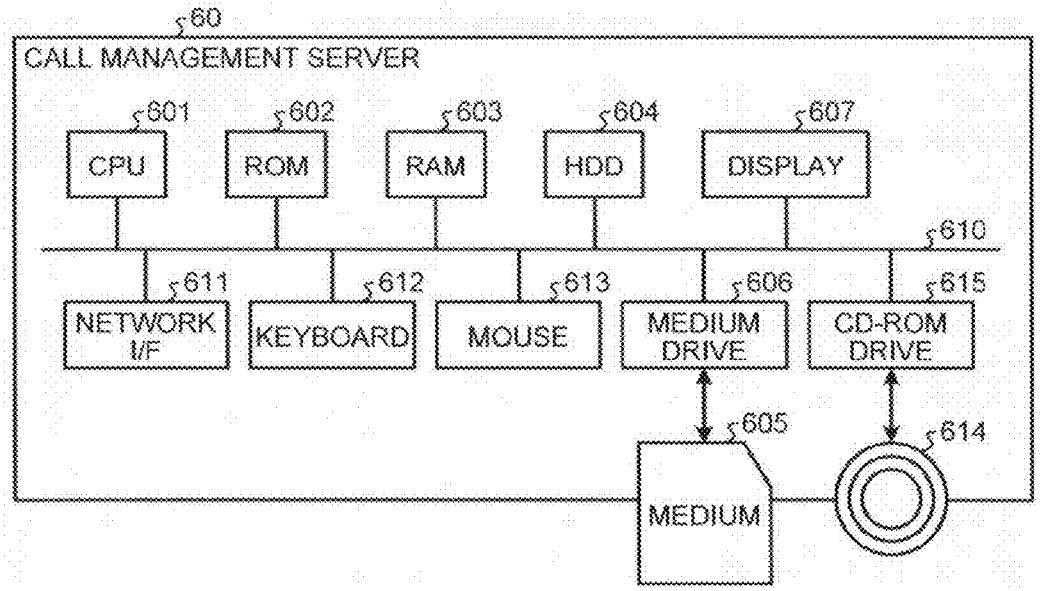
FIG. 11 is a diagram illustrating a hardware configuration of a call management server according to the embodiment.

FIG. 11 is a diagram illustrating a hardware configuration of the call management server 60 according to the embodiment. The hardware configuration of the call management server 60 is basically the same as the hardware configuration of the positional information server 50 as illustrated in FIG. 6.

The only difference between them is computer programs to be executed on a CPU 601; therefore, description of FIG. 11 is omitted.

FIG. 12 is a functional block diagram illustrating the call management server 60 according to the embodiment. The call management server 60 includes a network transmitter/receiver 6001, an operation status update processor 6002, a positional information update processor 6003, a call terminal authentication unit 6004, a destination list creator 6005, and a writing/reading processor 6006. The respective parts are functions or units that are made to operate by the constituent elements as illustrated in FIG. 11 and by executing programs loaded on a RAM 603 from an HDD 604 on the CPU 601.

In addition, the call management server 60 includes a volatile storage unit 6020 constructed by the RAM 603 as illustrated in FIG. 11, and a non-volatile storage unit 6030 constructed by the HDD 604, a storage medium 605, or the like as illustrated in FIG. 11. The non-volatile storage unit 6030 holds a call terminal authentication management table 6032, a call terminal management table 6034, and a destination list management table 6036.

FIG. 13 is a view illustrating a configuration example of the call terminal authentication management table 6032. As illustrated in FIG. 13, the call terminal authentication management table 6032 manages passwords so as to correspond to the call terminal information (call terminal IDs) of the respective call terminals 10 and the respective mobile call terminals 11 managed by the call management server 60.

FIG. 14 is a view illustrating a configuration example of the call terminal management table (terminal status storage unit) 6034. As illustrated in FIG. 14, the call terminal management table 6034 manages the call terminal names, the current operation statuses, the current (latest) positional information and the information leakage risk information, the IP addresses of the call terminals, and the like for the respective call terminal information (call terminal IDs) of the call terminals 10 and the mobile call terminals 11.

FIG. 15 is a view illustrating a configuration example of the destination list management table (destination list storage unit) 6036. As illustrated in FIG. 15, the destination list management table 6036 manages call terminal information of the call terminals 10 and the mobile call terminals 11 registered as candidates of the address (communication destination) call terminals so as to correspond to the call terminal information of the call terminal 10 or the mobile call terminal 11 as a request source that requests to start a call for a video-conference. FIG. 15 illustrates a fact that the candidates of the destination call terminals to which the call terminal of "10001" can request to start the call for the video-conference are call terminals of "10002", "10003", "10004", and the like. The candidates of the destination call terminals are registered newly, added, or deleted in accordance with a request from arbitrary call terminal 10 or mobile call terminal 11 if needed.

Returning to FIG. 12, described are operations of the processing functions 6001 to 6005 of the call management server 60.

The network transmitter/receiver 6001 is made to operate with a network I/F 611 in FIG. 11 and transmits and receives various pieces of information to/from the call terminals 10 and the mobile call terminals 11, and the positional information server 50 through the Internet (communication network) 70 under control by the CPU 601. To be more specific, the network transmitter/receiver 6001 receives latest positional information and latest information leakage risk information of the respective call terminals 10 and the respective mobile call terminals 11 from the positional information server 50. Furthermore, the network transmitter/receiver 6001 receives login request information and a destination list request from the call terminal as the request source that requests to start a call for a video-conference and transmits login permission and the candidate list (destination list) of the destination call terminals to the call terminal as the request source. The candidate list of the destination call terminals includes the terminal names, the operation statuses, the positional information, the information leakage risk information, the IP addresses, and the like of the respective destination call terminals. Furthermore, the network transmitter/receiver 6001 receives information (operation status information) indicating operation statuses of call terminals from the call terminals 10 and the mobile call terminals 11 if needed.

The operation status update processor 6002 is made to operate with the processing of the CPU 601 in FIG. 11. When the operation status update processor 6002 has received operation status information of a call terminal from the call terminal 10 or the mobile call terminal 11, the operation status update processor 6002 performs update processing of operation status information in the entry of the corresponding call terminal information on the call terminal management table 6034 in the non-volatile storage unit 6030 through the writing/reading processor 6006.

The positional information update processor 6003 is also made to operate with the processing of the CPU 601 in FIG. 11. When the positional information update processor 6003 has received the latest positional information and the latest information leakage risk information of the call terminal 10 or the mobile call terminal from the positional information server 50, the positional information update processor 6003 performs update processing on the positional information and the information leakage risk information in the entry of the corresponding call terminal information on the call terminal management table 6034 in the non-volatile storage unit 6030 through the writing/reading processor 6006.

The call terminal authentication unit 6004 is also made to operate with the processing of the CPU 601 in FIG. 11. When the call terminal authentication unit 6004 has received login request information from the call terminal (arbitrary call terminal 10 or arbitrary mobile call terminal 11) as the request source that requests to start a call for a video-conference, the call terminal authentication unit 6004 performs the authentication processing of the call terminal as the request source by referring to the call terminal authentication management table 6032 in the non-volatile storage unit 6030 through the writing/reading processor 6006.

The destination list creator 6005 is also made to operate with the processing of the CPU 601 in FIG. 11. When the destination list creator 6005 has received destination list request information from the call terminal as the request source that has been authenticated, the destination list creator 6005 creates a candidate list of the destination call terminals by referring to the call terminal management table 6034 and the destination list management table 6036 through the writing/reading processor 6006. To be more specific, the destination list creator 6005 extracts all pieces of call terminal information of the call terminals 10 and the mobile call terminals 11 that have been registered as the candidates of the destination call terminals to the call terminal as the request source from the destination list management table 6036. In addition, the destination list creator 6005 searches the call terminal management table 6034 by using the extracted call terminal information as a search key so as to acquire the terminal names, the operation status information, the positional information, the information leakage risk information, the IP addresses, and the like of the respective destination call terminals and create the candidate list of the destination call terminals. The network transmitter/receiver 6001 transmits the candidate list (destination list) of the destination call terminals to the call terminal as the request source.

The writing/reading processor 6006 is made to operate with the processing of the CPU 601, a medium drive 606, and the like in FIG. 11 and performs writing/reading processing of various pieces of information on the volatile storage unit 6020 and the non-volatile storage unit 6030 for the network transmitter/receiver 6001, the operation status update processor 6002, the positional information update processor 6003, the call terminal authentication unit 6004, and the destination list creator 6005.

It is to be noted that the call management server 60 also has processing functions of newly registering, adding, and deleting the destination call terminal information on the destination list management table 6036 in accordance with a request from the call terminal 10 or the mobile call terminal 11. Note that the functions are omitted in FIG. 12.

Next, described is flow of overall operations of the videoconference system as the communication system according to the embodiment in detail.

First, described are operations until the latest positional information of the call terminal 10 and the mobile call terminal 11 are reflected to the call terminal management table 6034 (FIG. 14) of the call management server 60. Hereinafter, although the positional information of the mobile call terminal 11 is targeted for the convenience, the same holds true for the case of the positional information of the portable call terminal 10 basically.

When the call terminal 10 is a type of the call terminal installed fixedly in a main room of a user or the like, if the positional information (own terminal positional information) of the call terminal 10 is once set to the call terminal positional information table 5036 (FIG. 10) in the positional information server 50 and the call terminal management table 6034 (FIG. 14) in the call management server 60, the positional information is not changed thereafter unless the user or the like issues a change request so that description thereof is omitted.

The latest positional information of the mobile call terminal 11 can be acquired by using the Bluetooth terminal 20, the wireless LAN access point 30 or the GPS satellite 80. That is to say, when the Bluetooth terminal 20 or the wireless LAN access point 30 is present in the vicinity of the mobile call terminal 11, the positional information of the Bluetooth terminal 20 or the wireless LAN access point 30 can be set to the positional information of the mobile call terminal 11. Furthermore, the positional information of the mobile call terminal 11 can be acquired wherever the mobile call terminal 11 is located by using the GPS positional information of the GPS satellite 80.

Figure 16:
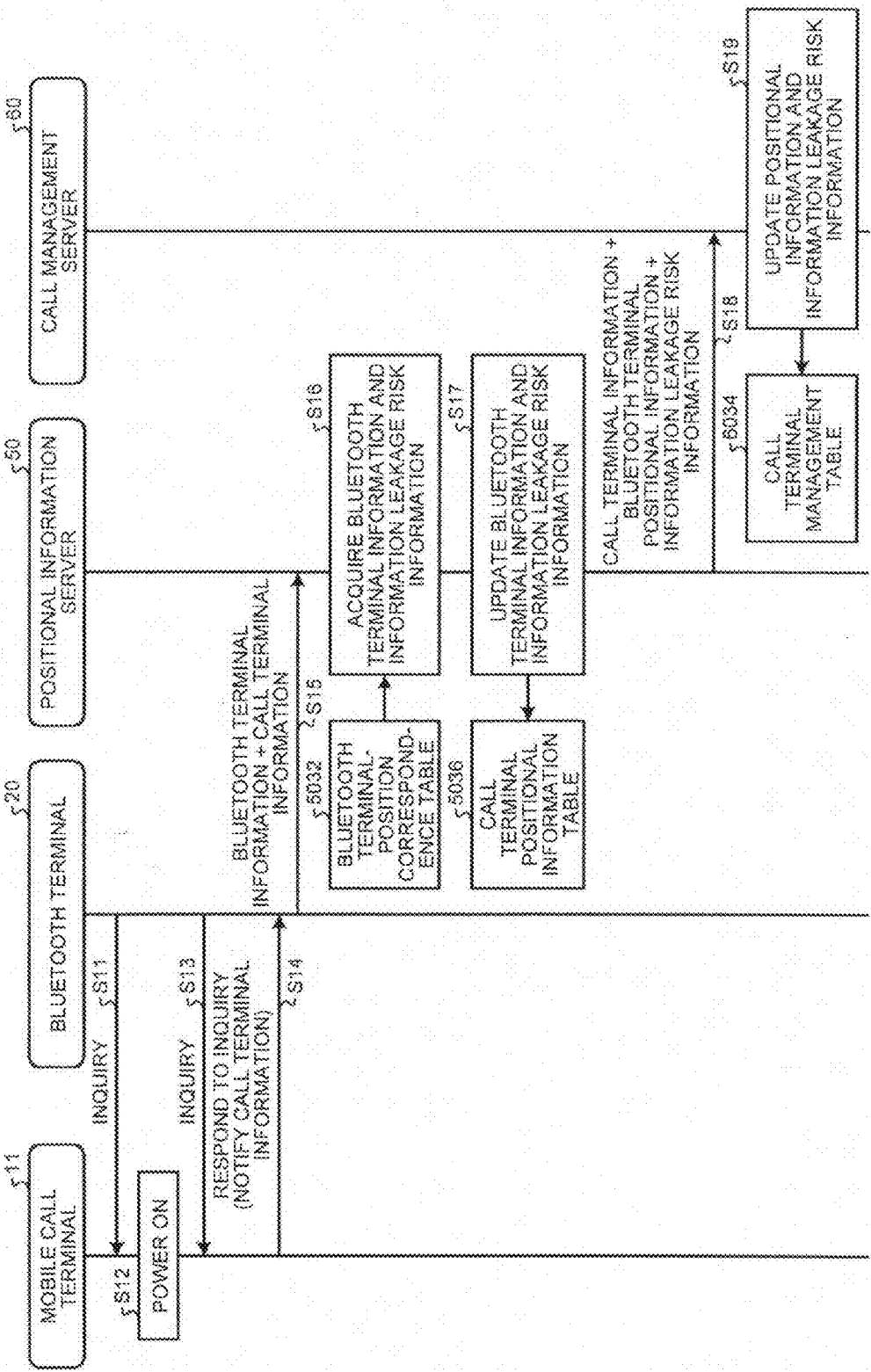
FIG. 16 is an operation sequence diagram until latest positional information (Bluetooth terminal positional information) of the call terminal is reflected to the call management server.

FIG. 16 is a sequence diagram illustrating an operation concept until the Bluetooth terminal 20 acquires the latest positional information of the mobile call terminal 11 and reflects it to the call terminal management table 6034 (FIG. 14) of the call management server 60.

The Bluetooth terminal 20 performs inquiry of the mobile call terminal 11 therearound all the time (Step S11). When the mobile call terminal 11 is powered ON and in an operation status (Step S12), the mobile call terminal 11 responds to the inquiry from the Bluetooth terminal 20 as long as the mobile call terminal 11 is present in a range where it can receive radio waves of the Bluetooth terminal 20 (Step S13, Step S14). The mobile call terminal 11 notifies the Bluetooth terminal 20 of the own call terminal information (terminal ID) in response to the inquiry. The Bluetooth terminal 20 adds the call terminal information of the inquired mobile call terminal 11 to the terminal information (Bluetooth terminal information) thereof and transmits it to the positional information server 50 (Step S15).

If the positional information server 50 has received the Bluetooth terminal information and the call terminal information from the Bluetooth terminal 20, the positional information server 50 searches the Bluetooth terminal-position correspondence table 5032 (FIG. 8) by using the received Bluetooth terminal information as a search key so as to acquire the positional information and the information leakage risk information of the Bluetooth terminal 20 (Step S16). Next, the positional information server 50 searches the call terminal positional information table 5036 (FIG. 10) by using the received call terminal information as a search key so as to update the Bluetooth terminal positional information and the information leakage risk information of the corresponding terminal information in the call terminal positional information table 5036 (Step S17). Then, the positional information server 50 adds the updated Bluetooth terminal positional information and the updated information leakage risk information to the call terminal information and transmits them to the call management server 60 (Step S18).

If the call management server 60 has received the call terminal information, the Bluetooth terminal positional information, and the information leakage risk information from the positional information server 50, the call management server 60 searches the call terminal management table 6034 (FIG. 14) by using the received call terminal information as a search key so as to update the positional information and the information leakage risk information of the corresponding call terminal information in the call terminal management table 6034 with the received Bluetooth terminal positional information and the received information leakage risk information (Step S19).

Figure 17:
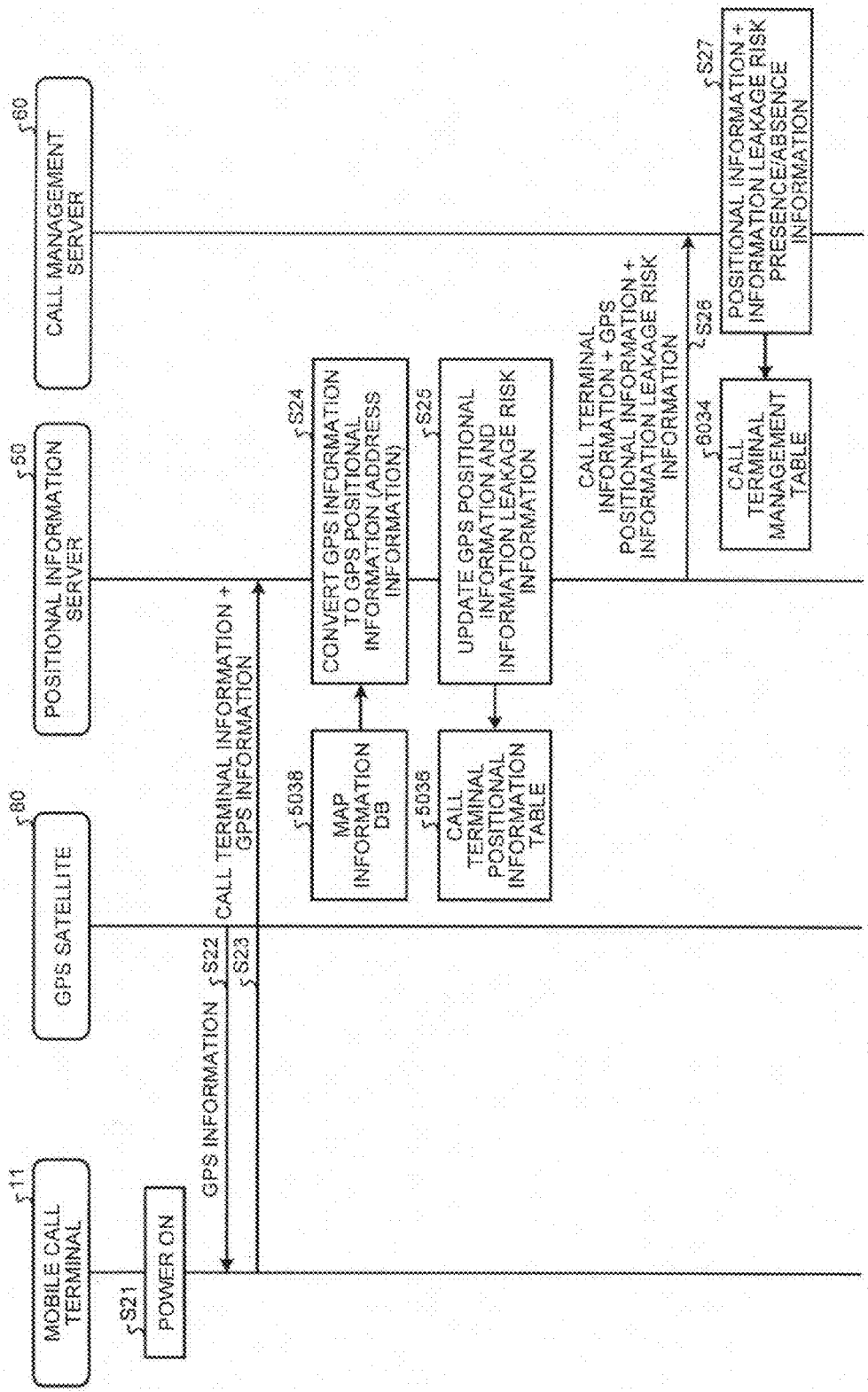
FIG. 17 is an operation sequence diagram until latest positional information (global positioning system (GPS) positional information) of the call terminal is reflected to the call management server.

FIG. 17 is a sequence diagram illustrating an operation concept until the latest positional information of the mobile call terminal 11 is acquired by using the GPS satellite 80 and is reflected to the call terminal management table 6034 (FIG. 14) of the call management server 60.

When the mobile call terminal 11 is powered ON and is in the operation status (Step S21), the mobile call terminal 11 can receive the GPS information from the GPS satellite 80 anytime anywhere. If the mobile call terminal 11 has received the GPS information from the GPS satellite 80 (Step S22), the mobile call terminal 11 adds the GPS information to the call terminal information thereof and transmits it to the positional information server 50 (Step S23).

If the positional information server 50 has received the call terminal information and the GPS information from the mobile call terminal 11, the positional information server 50 converts the received GPS information to GPS positional information of address information by using the map information database 5038 (Step S24). Furthermore, the positional information server 50 determines information leakage risk information based on the address. It is to be noted that as for the GPS positional information, the information leakage risk information may be set to be present all the time. Next, the positional information server 50 searches the call terminal positional information table 5036 (FIG. 10) by using the received call terminal information as a search key so as to update the GPS positional information and the information leakage risk information of the corresponding call terminal information in the call terminal positional information table 5036 (Step S25). Then, the positional information server 50 adds the updated GPS positional information and the updated information leakage risk information to the call terminal information and transmits them to the call management server 60 (Step S26).

If the call management server 60 has received the call terminal information, the GPS positional information, and the information leakage risk information from the positional information server 50, the call management server 60 searches the call terminal management table 6034 (FIG. 14) by using the received call terminal information as a search key so as to update the positional information and the information leakage risk information of the corresponding call terminal information in the call terminal management table 6034 with the received GPS positional information and the received information leakage risk information (Step S27).

Figure 18:
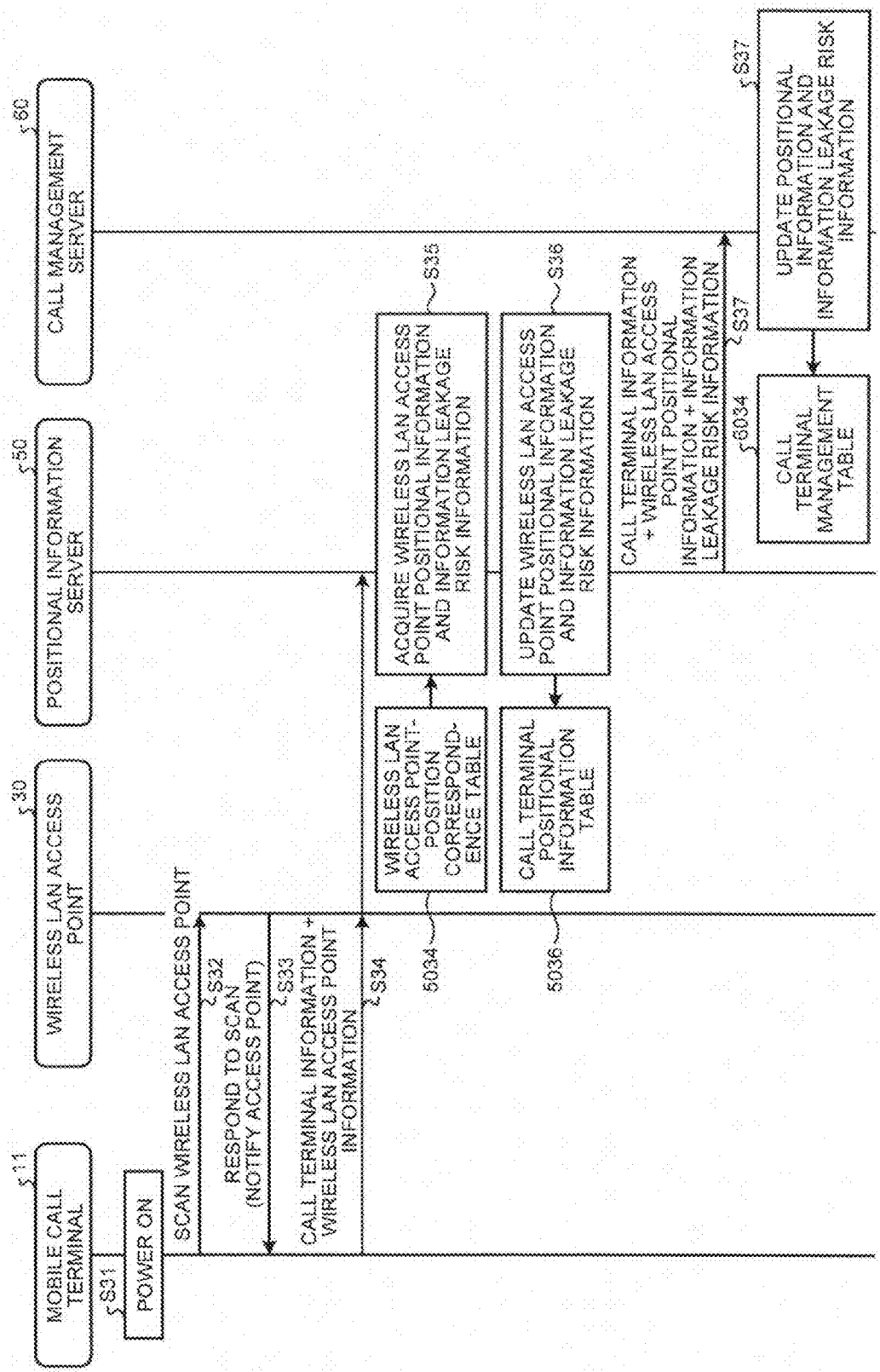
FIG. 18 is an operation sequence diagram until latest positional information (wireless LAN access point positional information) of the call terminal is reflected to the call management server.

FIG. 18 is a sequence diagram illustrating an operation concept until the latest positional information of the mobile call terminal 11 is acquired by using the wireless LAN access point 30 and is reflected to the call terminal management table 6034 (FIG. 14) of the call management server 60.

When the mobile call terminal 11 is powered ON and is in the operation status (Step S31), the mobile call terminal 11 can be connected to the Internet 70 through the wireless LAN access point 30 as long as the mobile call terminal 11 is present in a range where it can receive radio waves from the wireless LAN access point 30. The mobile call terminal 11 scans a wireless LAN access point in the vicinity thereof (Step S32). If the mobile call terminal 11 has been connected to the wireless LAN access point 30 wirelessly, the mobile call terminal 11 receives the wireless LAN access point information (access point ID) from the wireless LAN access point 30 (Step S33). The mobile call terminal 11 adds the wireless LAN access point information received from the wireless LAN access point 30 to the call terminal information thereof and transmits it to the positional information server 50 through the wireless LAN access point 30 (Step S34).

If the positional information server 50 has received the call terminal information and the wireless LAN access point information from the mobile call terminal 11, the positional information server 50 searches the wireless LAN access point-position correspondence table 5034 (FIG. 8) by using the received wireless LAN access point information as a search key so as to acquire the wireless LAN access point information and the information leakage risk information (Step S35). Next, the positional information server 50 searches the call terminal positional information table 5036 (FIG. 10) by using the received call terminal information as a search key so as to update the wireless LAN access point positional information and the information leakage risk information of the corresponding call terminal information in the call terminal positional information table 5036 (Step S36). Then, the positional information server 50 adds the updated wireless LAN access point positional information and the updated information leakage risk information to the call terminal information and transmits them to the call management server 60 (Step S37).

If the call management server 60 has received the call terminal information, the wireless LAN access point positional information, and the information leakage risk information from the positional information server 50, the call management server 60 searches the call terminal management table 6034 (FIG. 14) by using the received call terminal information as a search key so as to update the positional information and the information leakage risk information of the corresponding call terminal information in the call terminal management table 6034 with the received wireless LAN access point positional information and the received information leakage risk information (Step S38).

Figure 19:
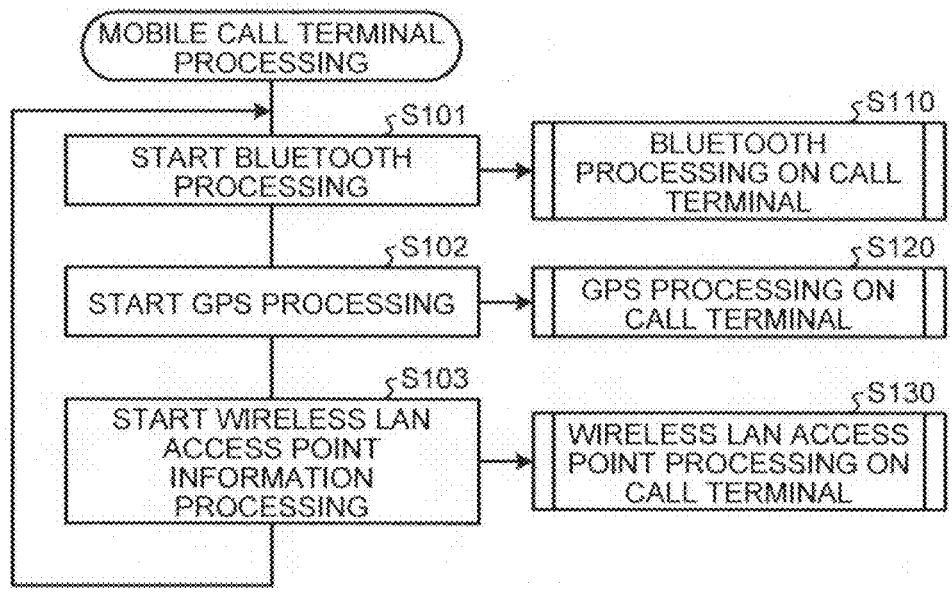
FIG. 19 is a conceptual view illustrating positional information transmission processing flow of the call terminal.

FIG. 19 is a flowchart illustrating a series of processing flow on the mobile call terminal relating to the operation sequences of FIG. 16 to FIG. 18. The mobile call terminal 11 starts Bluetooth processing first (Step S101), and executes the Bluetooth processing (Step S110). Next, the mobile call terminal 11 starts GPS processing (Step S102), and executes the GPS processing (Step S120). Finally, the mobile call terminal 11 starts wireless LAN access point processing (Step S103), and executes the wireless LAN access point processing (Step S130). Hereinafter, these pieces of processing are repeated. It is to be noted that the processing flow in FIG. 19 is merely an example and any processing may be started first.

Figure 20:
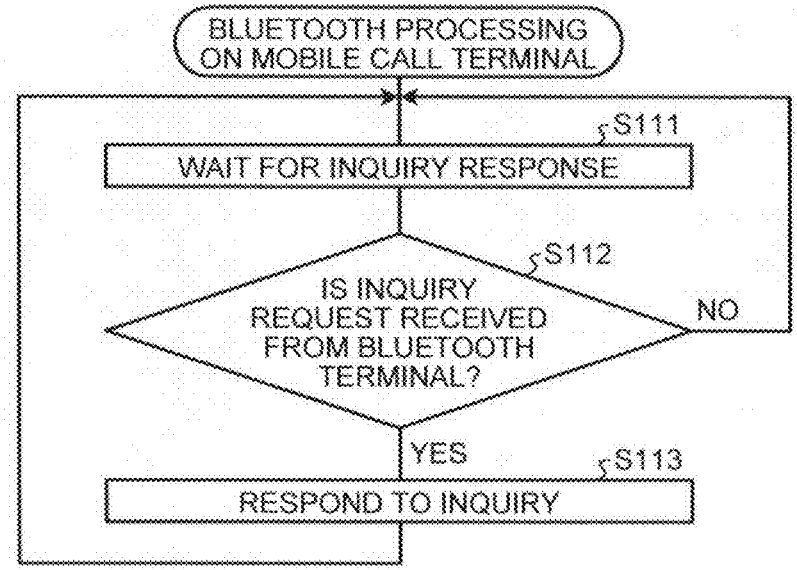
FIG. 20 is a flowchart illustrating Bluetooth processing of the call terminal.

FIG. 20 is a flowchart illustrating the Bluetooth processing flow on the mobile call terminal 11. The mobile call terminal 11 is powered ON so as to make Inquiry response in accordance with the Specification of the Bluetooth System (Step S111). In this state, the mobile call terminal 11 can be inquired from the Bluetooth terminal 20 as long as the mobile call terminal 11 is present in a range where it can receive radio waves of the Bluetooth terminal 20. In this case, the Bluetooth information transmitter/receiver 1002 (FIG. 4) of the mobile call terminal 11 receives an Inquiry request from the Bluetooth terminal 20 (Step S112), the Bluetooth information transmitter/receiver 1002 makes the Inquiry response (Step S113). With the Inquiry response, the Bluetooth information transmitter/receiver 1002 of the mobile call terminal 11 notifies the Bluetooth terminal 20 of the own call terminal information (terminal ID) thereof, and other information. It is to be noted that the processing flow of the Bluetooth terminal 20 will be described later.

Figure 21:
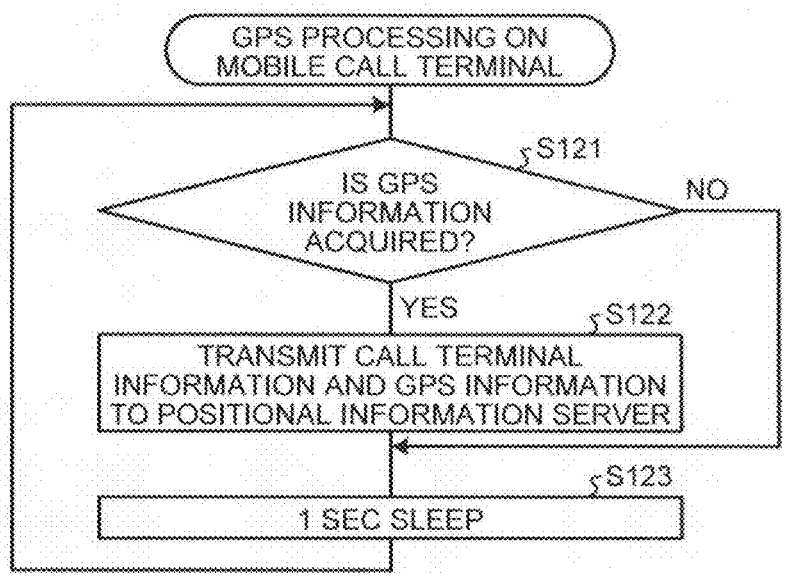
FIG. 21 is a flowchart illustrating GPS processing of the call terminal.

FIG. 21 is a flowchart illustrating the GPS processing on the mobile call terminal 11. When the mobile call terminal 11 is in the operation status, the mobile call terminal 11 can receive the GPS information from the GPS satellite 80 anytime anywhere. The GPS information transmitter/receiver 1001 (FIG. 4) of the mobile call terminal 11 searches GPS satellite radio waves from the GPS satellite 80 so as to acquire the GPS information (Step S121). If the GPS information receiver 1001 can have the acquired GPS information, the network transmitter/receiver 1004 (FIG. 4) of the mobile call terminal 11 transmits the own call terminal information and the GPS information to the positional information server 50 through the Internet 70 (Step S122). Hereinafter, the mobile call terminal 11 repeats the pieces of processing at Step S121 and Step S122 at an arbitrary interval (Step S123).

Figure 22:
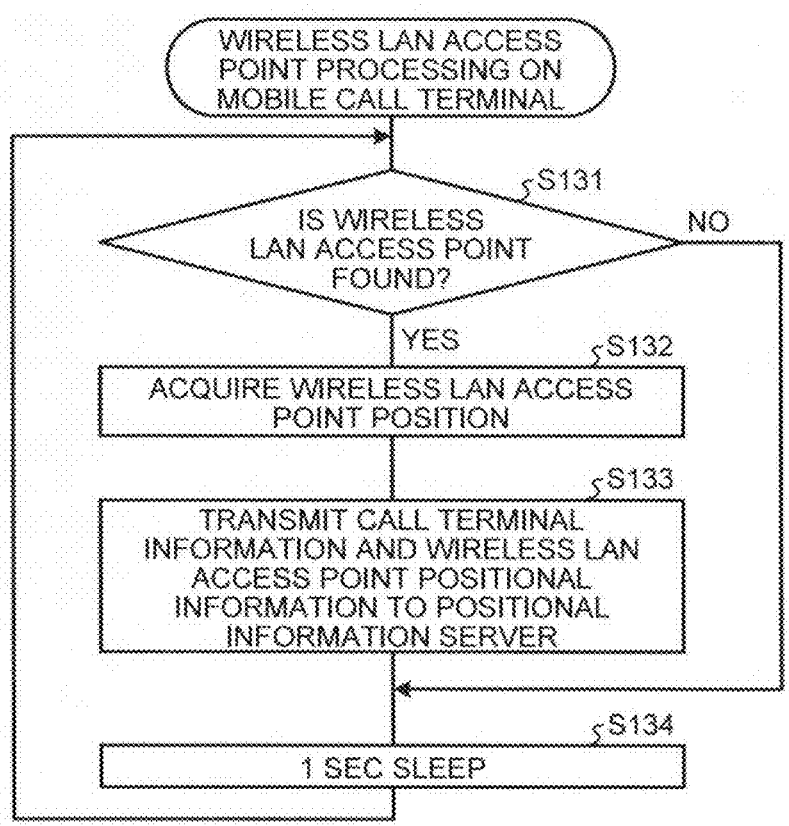
FIG. 22 is a flowchart illustrating wireless LAN access point processing of the call terminal.

FIG. 22 is a flowchart illustrating the wireless LAN access point processing flow on the mobile call terminal 11. The wireless LAN access point information transmitter/receiver 1003 (FIG. 4) of the mobile call terminal 11 searches whether the wireless LAN access point 30 is present in the vicinity thereof (Step S131). If the wireless LAN access point 30 has been found, the wireless LAN access point information transmitter/receiver 1003 acquires information of the wireless LAN access point 30 (wireless LAN access point information) (Step S132). The network transmitter/receiver 1004 (FIG. 3) of the mobile call terminal 11 transmits the own call terminal information and the wireless LAN access point information to the positional information server 50 through the wireless LAN access point 30 and the Internet 70. Hereinafter, the mobile call terminal 11 repeats the pieces of processing at Steps S131 to S134 at an arbitrary interval.

Figure 23:
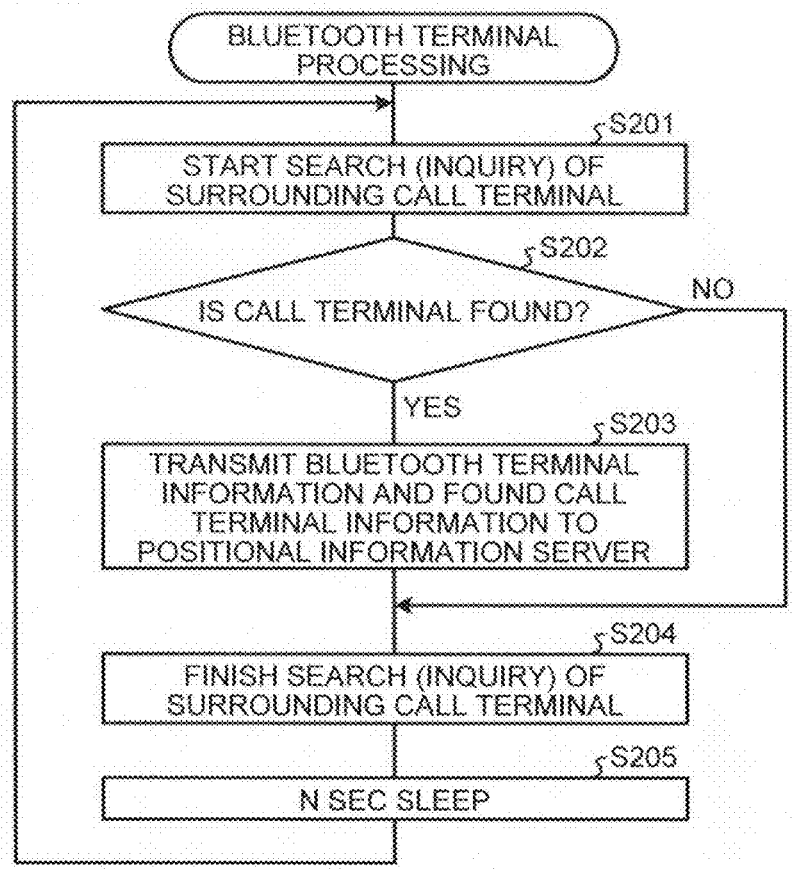
FIG. 23 is a flowchart illustrating processing of the Bluetooth terminal.

Next, described is the processing of the Bluetooth terminal 20. FIG. 23 is a flowchart illustrating processing flow of the Bluetooth terminal 20.

The Bluetooth terminal 20 starts search (Inquiry) of call terminals therearound in accordance with the Specification of the Bluetooth System (Step S201). As a result of the search, if the Bluetooth terminal 20 has found the call terminal (mobile call terminal 11 in this example) and receives Inquiry response from the mobile call terminal 11 (Step S202), the Bluetooth terminal 20 transmits the own Bluetooth terminal information and the call terminal information notified from the mobile call terminal 11 to the positional information server 50 (Step S203). Thereafter, the Bluetooth terminal 20 once finishes the search of call terminals therearound (Step S204). Then, if an arbitrary period of time has elapsed (Step S205), the Bluetooth terminal 20 starts the search of call terminals therearound, again. That is to say, the Bluetooth terminal 20 performs the search of call terminals therearound every constant time, and adds information of the found call terminal to the own Bluetooth terminal information and transmits it to the positional information server 50.

Figure 24:
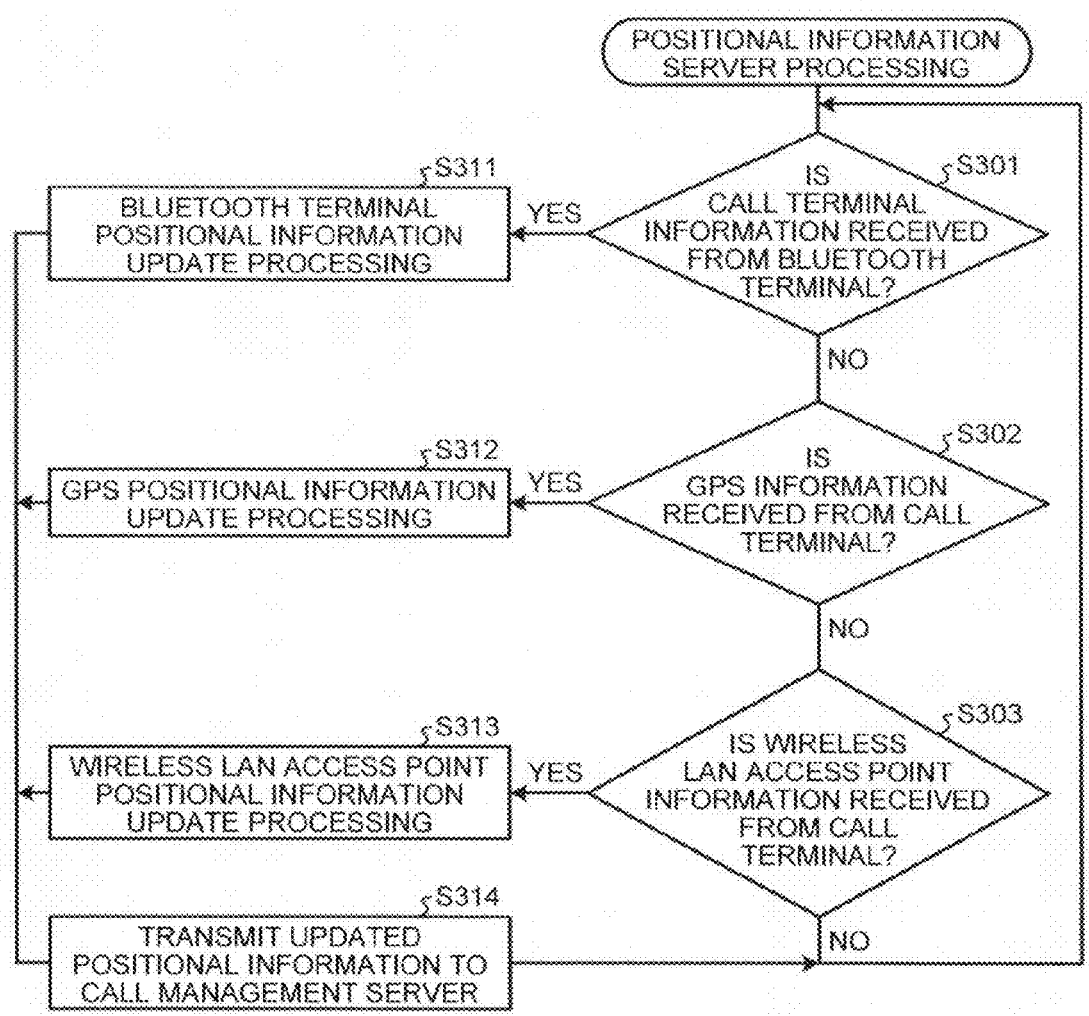
FIG. 24 is a flowchart illustrating processing of the positional information server.

Next, described is the processing of the positional information server 50. FIG. 24 is a flowchart illustrating processing flow on the positional information server 50 relating to the operation sequences in FIG. 16 to FIG. 18.

The positional information server 50 monitors whether it receives information from the call terminal 10 or the mobile call terminal 11 (mobile call terminal in this example) and the Bluetooth terminal 20 all the time (Steps S301 to S303). It is to be noted that any of the pieces of processing at Steps S301 to S303 may be started first.

If the positional information server 50 has received call terminal information (Bluetooth terminal information+call terminal information) from the Bluetooth terminal 20 (Yes at 301), the positional information server 50 executes the Bluetooth terminal positional information update processing (Step S311). To be more specific, the positional information processor 5002 of the positional information server 50 acquires positional information (Bluetooth terminal positional information) and information leakage risk information corresponding to the Bluetooth terminal information from the Bluetooth terminal-position correspondence table 5032 (FIG. 8) through the writing/reading processor 5003 (Step S16 in FIG. 16). Then, the positional information processor 5002 of the positional information server 50 updates the Bluetooth terminal positional information and the information leakage risk information of the corresponding call terminal information in the call terminal positional information table 5036 (FIG. 10) (Step S17 in FIG. 16). Subsequently, the positional information processor 5002 of the positional information server 50 adds the updated Bluetooth terminal positional information and the updated information leakage risk information to the call terminal information and transmits them to the call management server 60 through the network transmitter/receiver 5001 (Step S314; Step S18 in FIG. 16). Furthermore, if the positional information server 50 has received GPS information (call terminal information+GPS information) from the mobile call terminal 11 (YES at Step S302), the positional information server 50 executes the GPS positional information update processing (Step S312). To be more specific, the positional information processor 5002 of the positional information server 50 converts the GPS information to GPS positional information of address information by using the map information database 5038 through the writing/reading processor 5003 first. Then, the positional information processor 5002 of the positional information server 50 determines information leakage risk information (Step S24 in FIG. 17), and then, updates the GPS positional information and the information leakage risk information of the corresponding call terminal information in the call terminal positional information table 5036 (FIG. 10) (Step S25 in FIG. 17). Thereafter, the positional information processor 5002 of the positional information server 50 adds the updated GPS positional information and the updated information leakage risk information to the call terminal information and transmits them to the call management server 60 through the network transmitter/receiver 5001 (Step S314; Step S26 in FIG. 17).

Furthermore, if the positional information server 50 has received wireless LAN access point information (call terminal information+wireless LAN access point information) from the mobile call terminal 11 (Yes at Step S303), the positional information server 50 executes wireless LAN access point positional information update processing (Step S313). To be more specific, the positional information processor 5002 of the positional information server 50 acquires positional information corresponding to the wireless LAN access point information (wireless LAN access point positional information) and information leakage risk information from the wireless LAN access point-position correspondence table 5034 (FIG. 9) through the writing/reading processor 5003 first (Step S35 in FIG. 18). Then, the positional information processor 5002 of the positional information server 50 updates wireless LAN access point positional information and information leakage risk information of the corresponding call terminal information in the call terminal positional information table 5036 (FIG. 10) (Step S36 in FIG. 18). Thereafter, the positional information processor 5002 of the positional information server 50 adds the updated wireless LAN access point positional information and the updated information leakage risk information to the call terminal information and transmits them to the call management server 60 through the network transmitter/receiver 5001 (Step S314; Step S37 in FIG. 18).

It is considered that the Bluetooth terminal positional information, the wireless LAN access point positional information, and the GPS positional information are acquired for one mobile call terminal 11 depending on the position of the mobile call terminal 11 in some cases. In this case, the positional information processor 5002 of the positional information server 50 selects any one positional information of the Bluetooth terminal positional information, the wireless LAN access point positional information, and the GPS positional information at Step S314 and transmits it to the call management server 60 through the network transmitter/receiver 5001. Hereinafter, described is an example of the selection method.

The Bluetooth terminal positional information, the wireless LAN access point positional information, and the GPS positional information are lined in the order from positional information having higher accuracy as follows. That is, in general, the following relation is satisfied: the Bluetooth terminal positional information>the wireless LAN access point positional information>the GPS positional information.

If the Bluetooth terminal positional information can be acquired as the current positional information of one mobile call terminal 11, the wireless LAN access point positional information and the GPS positional information with lower accuracy are not necessary. The positional information processor 5002 of the positional information server 50 has acquired (updated) the Bluetooth terminal positional information, the wireless LAN access point positional information, and the GPS positional information, the positional information processor 5002 of the positional information server 50 selects the Bluetooth terminal positional information and information leakage risk information thereof, and transmits them to the call management server 60 through the network transmitter/receiver 5001. For the same reason, when positional information processor 5002 of the positional information server 50 has not acquired the Bluetooth terminal positional information and has acquired the wireless LAN access point positional information and the GPS positional information, the positional information processor 5002 of the positional information server 50 transmits the wireless LAN access point positional information and the information leakage risk information thereof to the call management server 60.

Figure 25:
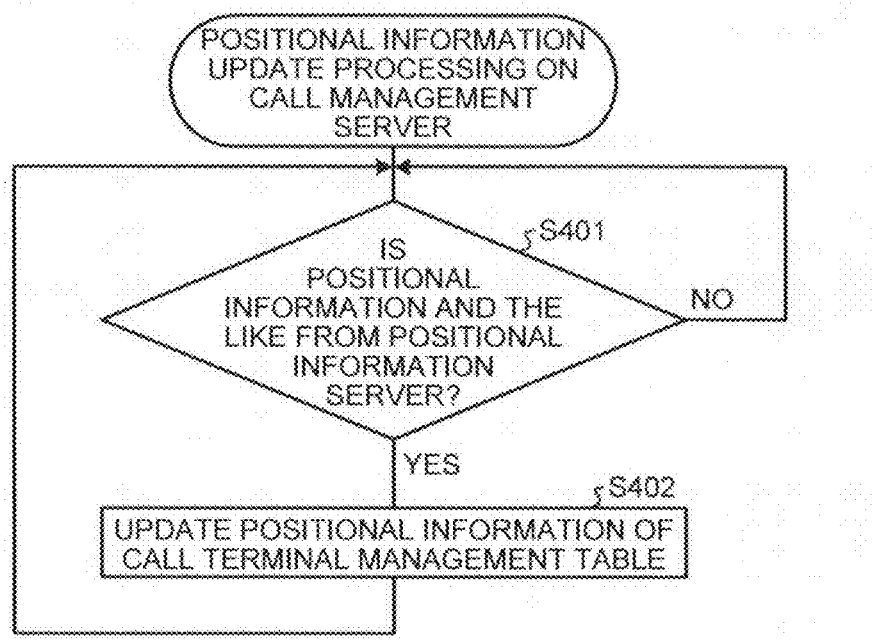
FIG. 25 is a flowchart illustrating positional information update processing of the call management server.

FIG. 25 is a flowchart illustrating the positional information update processing flow on the call management server 60 relating to the operation sequences in FIG. 16 to FIG. 18. The call management server 60 monitors whether it receives positional information and the like from the positional information server 50 all the time (Step S401). This processing is performed independently from monitoring of reception of a login request and the like from the call terminal 10 or the mobile call terminal 11, which will be described later. If the call management server 60 has received the positional information and the like from the positional information server 50 (YES at Step S401), the call management server 60 updates the positional information and the like in the call terminal management table 6034 (FIG. 14) (Step S402). To be more specific, if the positional information update processor 6003 of the call management server 60 has received the Bluetooth terminal positional information and the information leakage risk information together with the call terminal information from the positional information server 50, the positional information update processor 6003 of the call management server 60 updates the positional information and the information leakage risk information of the corresponding call terminal information in the call terminal management table 6034 with the received Bluetooth terminal positional information and the received information leakage risk information (Step S19 at FIG. 16). Furthermore, when the positional information update processor 6003 of the call management server 60 has received the GPS positional information and the information leakage risk information together with the call terminal information from the positional information server 50, the positional information update processor 6003 of the call management server 60 updates the positional information and the information leakage risk information of the corresponding call terminal information in the call terminal management table 6034 with the received GPS positional information and the received information leakage risk information in the same manner (Step S27 in FIG. 17). Furthermore, the positional information update processor 6003 of the call management server 60 has received the wireless LAN access point positional information and the information leakage risk information together with the call terminal information from the positional information server 50, the positional information update processor 6003 of the call management server 60 updates the positional information and the information leakage risk information of the corresponding call terminal information in the call terminal management table 6034 with the received wireless LAN access point positional information and the received information leakage risk information in the same manner (Step S38 in FIG. 18).

As described above, the call terminal management table 6034 (FIG. 14) of the call management server 60 holds the latest (current) positional information and the latest information leakage risk information of the respective call terminals 10 and mobile call terminals 11.

Next, described are operations when a video-conference is held between the plurality of call terminals 10 and mobile call terminals 11.

FIG. 26 is a sequence diagram illustrating an operation concept until the video-conference is started between the plurality of call terminals 10 and mobile call terminals 11. In FIG. 26, the call terminal 10 is set to the communication source and the mobile call terminal 11 is set to the communication destination for the convenience. Alternatively, the mobile call terminal 11 may be set to the communication source and the call terminal 10 may be set to the communication destination. Furthermore, although only one mobile call terminal 11 is illustrated as the terminal as the communication destination in FIG. 26, a plurality of call terminals 10 and mobile call terminals 11 correspond to the terminals as the communication destinations in general.

The call terminal 10 as the communication source is powered ON (Step S41) before starting the video-conference so as to transmit login request information to the call management server 60 through the network transmitter/receiver 1004 by the login request unit 1006 (Step S42). The login request information includes call terminal information (terminal ID) and a password of the call terminal 10 as the communication source (request source).

If the call management server 60 has received the login request information from the call terminal 10, the call management server 60 executes the authentication processing of the call terminal 10 (Step S43) by referring to the call terminal authentication management table 6032 (FIG. 13), and returns an authentication result to the call terminal 10 through the network transmitter/receiver 6001 (Step S44). To be more specific, the call terminal authentication unit 6004 of the call management server 60 determines that the login request is a login request from the call terminal 10 having right usage authority if the call terminal information and the password received from the call terminal 10 have been registered in the call terminal authentication management table 6032 (FIG. 13). In this case, the call management server 60 returns the authentication result indicating that the login request has been permitted to the call terminal 10.

If the call terminal 10 has received the authentication result indicating that the login request has been permitted, the call terminal 10 transmits destination list request information indicating that it requests the destination list of the communication destinations to the call management server 60 through the network transmitter/receiver 1004 (Step S45).

If the call management server 60 has received the destination list request information from the call terminal 10, the call management server 60 creates destination list information of the communication destinations of the call terminal 10 by referring to the call terminal management table 6034 (FIG. 14) and the destination list management table 6036 (FIG. 15) (Step S46). To be more specific, the destination list creator 6005 of the call management server 60 searches the destination list management table 6036 (FIG. 15) by using the call terminal information of the call terminal 10 as a search key so as to extract a list of the destination call terminal information corresponding to the call terminal information (request source communication terminal information) of the call terminal 10. Next, the destination list creator 6005 of the call management server 60 searches the call terminal management table 6034 (FIG. 14) by using the extracted destination call terminal information as a search key so as to acquire the terminal names, the operation status information, the positional information, the information leakage risk information, the IP addresses, and the like of the respective destination call terminals (call terminals as communication destinations) and create the destination list information.

The call management server 60 transmits the created destination list information to the call terminal 10 as the request source (Step S47). The destination list information contains the "terminal names, operation status information, positional information, information leakage risk information, IP addresses", and the like of the respective destination call terminals (call terminals as communication destinations) corresponding to the call terminal 10 as the request source.

If the call terminal 10 has received the destination list information from the call management server 60, the call terminal 10 creates display destination list information from the destination list information by the display destination list creator 1010 (Step S48). To be more specific, corresponding operation status icons are assigned to the display of the "operation status information" in the destination list information by referring to the operation status icon management table 1032 (FIG. 4). Furthermore, normal display is assigned to the display of the "positional information" in the destination list information when the information leakage risk is absent and shaded display is assigned when the information leakage risk is present based on the information leakage risk information. This is merely an example and blue display may be assigned when the information leakage risk is absent and red display may be assigned when the information leakage risk is present, for example. It is sufficient that the display of the positional information in accordance with the information leakage risk information is defined previously.

Next, the call terminal 10 displays the destination list on the display 150 based on the created display destination list information by the display controller 1011 (Step S49). A user of the call terminal 10 selects a destination call terminal on which no problem seems to arise in terms of security from the displayed destination list (Step S50). In this example, it is assumed that the user selects the mobile call terminal 11. Then, the call terminal 10 transmits a conference start request to the mobile call terminal 11 through the call management server 60 (Step S51), and the mobile call terminal 11 returns the response to the call terminal 10 through the call management server 60 in the same manner (Step S52). Thereafter, the video-conference is started between the call terminal 10 and the mobile call terminal 11 (Step S53).

FIG. 27 is a view illustrating a display example of the destination list on the display 150 of the call terminal 10. In FIG. 27, a reference numeral 151 indicates an operation status icon, a reference numeral 152 indicates a terminal name, a reference numeral 153 indicates positional information, and a reference numeral 154 indicates a scroll bar. The meaning of the operation status icon 151 is as illustrated in the operation status icon management table 1032 in FIG. 5. Furthermore, shaded display on the positional information 153 indicates that the information leakage occurs with high possibility.

In the case of the display example in FIG. 27, terminals capable of having call with the call terminal 10 as the communication source presently are a mobile terminal (Suzuki, sales division), a mobile terminal (Yamamoto, sales division), and a mobile terminal (shared, sales division). Among them, information leakage occurs on the mobile terminal (Yamamoto, sales division) and the mobile terminal (shared, sales division) with high possibility. If the user of the communication terminal 10 selects the mobile terminal (Suzuki, sales division) while excluding the above mobile terminals, the user can start the video-conference without worry about the information leakage.

Furthermore, if the user operates the scroll bar 154, still another destination list is displayed. This enables the user to select a call terminal with no worry about the information leakage among the call-capable terminals presently in the same manner.

Figure 28:
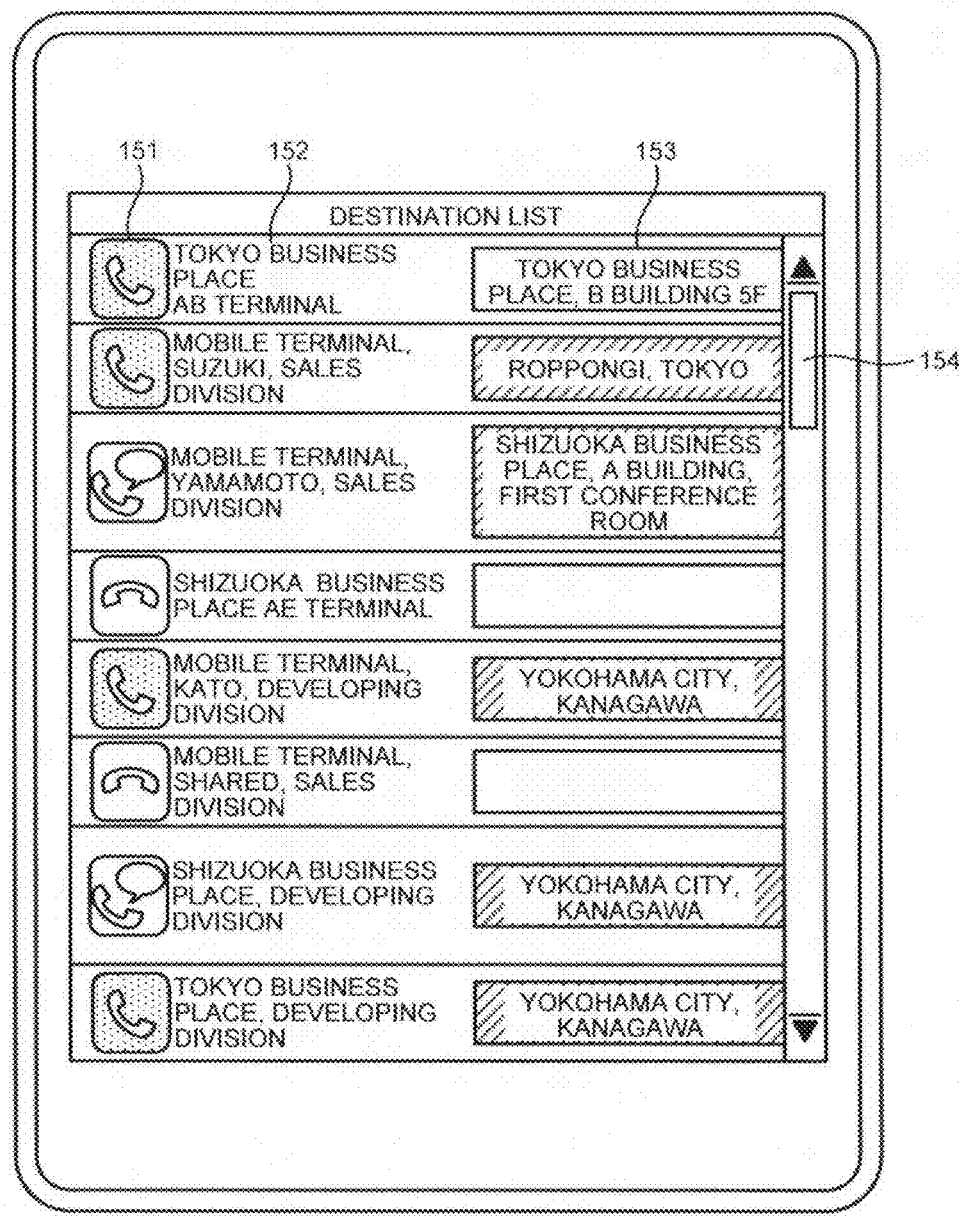
FIG. 28 is a view illustrating an example of the destination list display on a mobile call terminal as the communication source.

FIG. 28 is a view illustrating another display example of the destination list. This is a display example where the call terminal as the communication source is a mobile call terminal. Reference numerals 151 to 154 have the same meanings as those in FIG. 27. In the example of FIG. 28, if the user of the mobile call terminal selects an AB terminal in a Tokyo business place, the user can start the video-conference with the user of the AB terminal with no worry about the information leakage.

Figure 29:
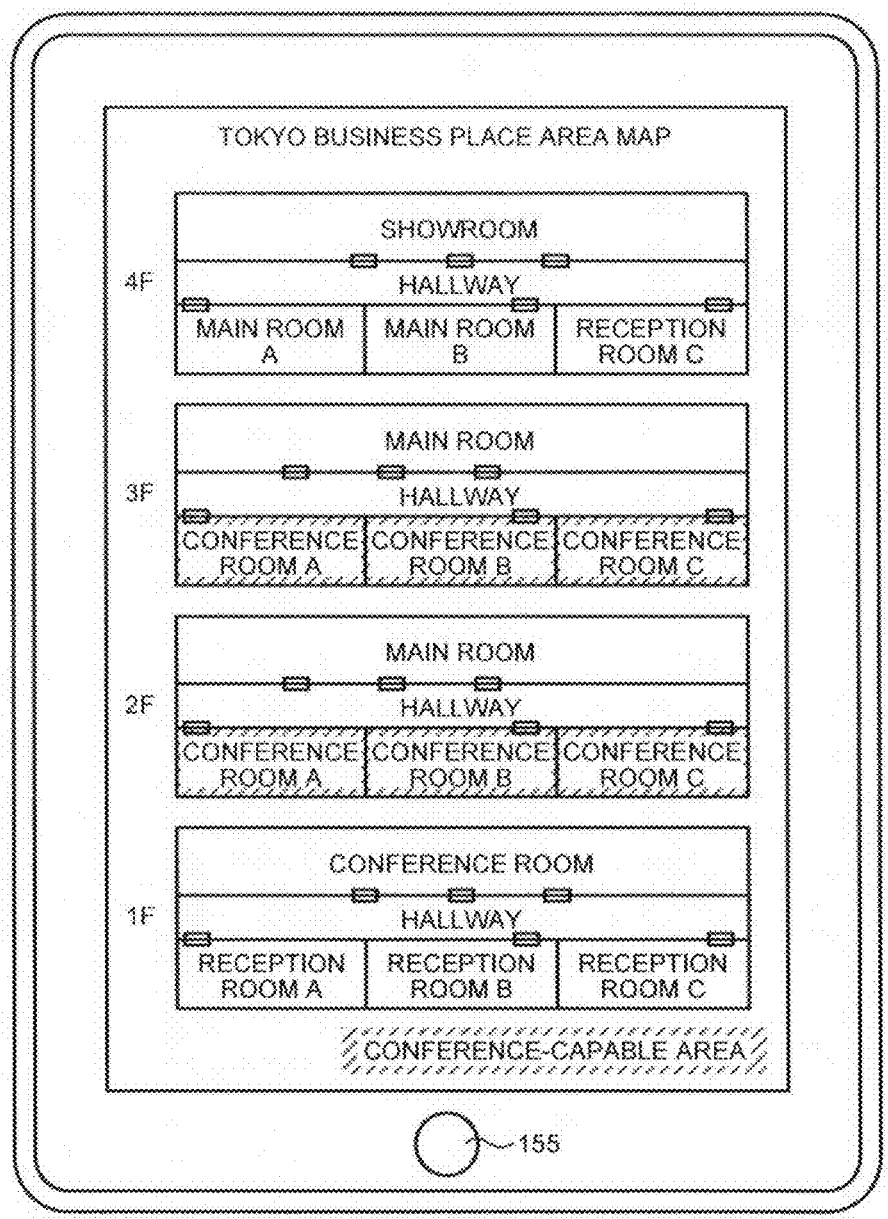
FIG. 29 is a view illustrating an example of area map display on a mobile call terminal as a communication destination.

As described above, the embodiment has been described. When the user of the call terminal 10 or the mobile call terminal 11 as the candidate of the communication destination is in an area where the information leakage occurs possibly, an area map is displayed and the user is notified of a close area where the information leakage does not occur so as to guide the user to the area where the information leakage does not occur. FIG. 29 illustrates a display example of the area map of the mobile call terminal 11 as the candidate of the communication destination. A reference numeral 155 indicates an area search button.

When the user of the mobile call terminal 11 is at an inappropriate place for having the video-conference for the security reason, the user presses the area search button 155. With this, the mobile call terminal 11 transmits an area map request to the positional information server 50. In this case, the mobile call terminal 11 also transmits the GPS information to the positional information server 50 together. The positional information server 50 returns the area map in accordance with the position of the mobile call terminal 11 to the mobile call terminal 11. For example, when the position of the mobile call terminal 11 is at the Tokyo business place, the positional information server 50 returns an area map of the Tokyo business place. The mobile call terminal 11 displays the area map transmitted from the positional information server 50 (FIG. 29). The user of the mobile call terminal 11 can join the video-conference while going to the appropriate area in terms of security by checking the displayed area map.

According to the embodiment, before a user as a communication source starts communication with a user as a communication destination, the user as the communication source can grasp surrounding environment of the user as the communication destination so as to determine whether the communication is started.

Although the invention has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD-ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A communication system comprising:
   a call management server connected to a communication network;
   a plurality of communication terminals configured to make communication with one another through the call management server, the communication terminals being connected to the communication network; and
   a positional information server connected to the communication network,
   the positional information server
      includes a terminal positional information storage unit configured to store therein positional information and information leakage risk information of each of the communication terminals,
      updates the positional information and the information leakage risk information of a communication terminal stored in the terminal positional information storage unit in accordance with a position of the communication terminal, and
      transmits the updated latest positional information and the updated latest information leakage risk information together with corresponding communication terminal information to the call management server,
   the call management server
      includes a destination list storage unit configured to store therein a list of communication terminals capable of joining communication for each of the communication terminals and a terminal status storage unit configured to store therein at least a terminal name, latest positional information, and latest information leakage risk information of each of the communication terminals,
      updates the positional information and the information leakage risk information of a corresponding communication terminal stored in the terminal status storage unit when receiving the positional information and the information leakage risk information together with the communication terminal information from the positional information server, and
      transmits the list containing at least the terminal name, the latest positional information, and the latest information leakage risk information of each of the communication terminals capable of joining the communication to a communication terminal as a communication source based on the destination list storage unit and the terminal status storage unit when receiving a list request from the communication terminal as the communication source, and
   the communication terminal as the communication source displays the list received from the call management server in a different display manner of the positional information in accordance with the information leakage risk information.

2. The communication system according to claim 1, wherein
   each of the communication terminals has a function of acquiring GPS information from a global positioning system (GPS) satellite and transmitting the GPS information together with own communication terminal information to the positional information server,
   the positional information server
      includes a map database,
      converts the GPS information to GPS positional information as address information by using the map database and determines information leakage risk information when receiving the communication terminal information and the GPS information from a communication terminal,
      stores therein the GPS positional information and the information leakage risk information as the positional information and the information leakage risk information of a communication terminal corresponding to the received communication terminal information, stored in the terminal positional information storage unit, and
      transmits the GPS positional information and the information leakage risk information as latest positional information and latest information leakage risk information of the communication terminal to the call management server.

3. The communication system according to claim 1, further comprising a plurality of wireless LAN access points connected to the communication network, wherein
   each of the communication terminals has a function of acquiring information of a wireless local area network (LAN) access point in the vicinity of the communication terminal and transmitting the information of the wireless LAN access point together with own communication terminal information to the positional information server, and
   the positional information server
      includes a wireless LAN access point-position correspondence storage unit configured to store therein positional information and information leakage risk information of each wireless LAN access point,
      acquires the positional information and the information leakage risk information of a wireless LAN access point corresponding to received wireless LAN access point information from the wireless LAN access point-position correspondence storage unit when receiving corresponding communication terminal information and the wireless LAN access point information from a communication terminal,
      stores therein the acquired positional information and the acquired information leakage risk information of the wireless LAN access point as the positional information and the information leakage risk information of the communication terminal corresponding to the received communication terminal information in the terminal positional information storage unit, and
      transmits the positional information and the information leakage risk information of the wireless LAN access point as latest positional information and latest information leakage risk information of the communication terminal to the call management server.

4. The communication system according to claim 1, further comprising a plurality of Bluetooth terminals connected to the communication network,
   each of the Bluetooth terminals has a function of acquiring information of a communication terminal in the vicinity of the Bluetooth terminal and transmitting the communication terminal information together with own communication terminal information to the positional information server, and the positional information server
includes a Bluetooth terminal-position correspondence storage unit configured to store therein positional information and information leakage risk information of each of the Bluetooth terminals,
acquires the positional information and the information leakage risk information of a Bluetooth terminal corresponding to received Bluetooth terminal information from the Bluetooth terminal-position correspondence storage unit when receiving the Bluetooth terminal information and corresponding communication terminal information from the Bluetooth terminal,
stores therein the acquired positional information and the acquired information leakage risk information of the Bluetooth terminal as the positional information and the information leakage risk information of a communication terminal corresponding to the received communication terminal information in the terminal positional information storage unit, and
transmits the positional information and the information leakage risk information of the Bluetooth terminal as latest positional information and latest information leakage risk information of the communication terminal to the call management server.

5. The communication system according to claim 1, further comprising:
a plurality of wireless local area network (LAN) access points connected to the communication network; and
a plurality of Bluetooth terminals connected to the communication network, wherein
each of the communication terminals
has a function of acquiring a global positioning system (GPS) information from a GPS satellite and transmitting the GPS information together with own communication terminal information to the positional information server, and
has a function of acquiring information of a wireless LAN access point in the vicinity of the communication terminal and transmitting the wireless LAN access point information together with own communication terminal information to the positional information server,
each of the Bluetooth terminals has a function of acquiring information of a communication terminal in the vicinity of the Bluetooth terminal and transmitting the communication terminal information together with own Bluetooth terminal information to the positional information server,
the positional information server
includes a wireless LAN access point-position correspondence storage unit configured to store therein map database, and positional information and information leakage risk information of each of the wireless LAN access points, and a Bluetooth terminal-position correspondence storage unit configured to store therein positional information leakage risk information of each of the Bluetooth terminals,
converts the GPS information to GPS positional information as address information by using the map database and determines information leakage risk information when receiving corresponding communication terminal information and the GPS information from a communication terminal,
stores therein the GPS positional information and the information leakage risk information as positional information and information leakage risk information of the communication terminal corresponding to the received communication terminal information in the terminal positional information storage unit,
acquires positional information and information leakage risk information of a wireless LAN access point corresponding to received wireless LAN access point information from the wireless LAN access point-position correspondence storage unit when receiving corresponding communication terminal information and the wireless LAN access point information from a communication terminal,
stores therein the acquired positional information and the acquired information leakage risk information of the wireless LAN access point as positional information and information leakage risk information of the communication terminal corresponding to the received communication terminal information in the terminal positional information storage unit,
acquires positional information and information leakage risk information of a Bluetooth terminal corresponding to received Bluetooth terminal information from the terminal positional information storage unit when receiving the Bluetooth terminal information and corresponding communication terminal information from the Bluetooth terminal,
stores therein the acquired positional information and the acquired information leakage risk information of the Bluetooth terminal as positional information and information leakage risk information of the communication terminal corresponding to the received communication terminal information in the terminal positional information storage unit, and
selects any one set of positional information and information leakage risk information and transmits the selected set of positional information and information leakage risk information as latest positional information and latest information leakage risk information of the corresponding communication terminal to the call management server when at least two of a set of the GPS positional information and the corresponding information leakage risk information, a set of the positional information and the information leakage risk information of the wireless LAN access point, and a set of the positional information and the information leakage risk information of the Bluetooth terminal are stored in the terminal positional information storage unit for the same communication terminal.

6. The communication system according to claim 5, wherein the positional information server selects any one set of positional information and information leakage risk information in the order of priority of the positional information of the Bluetooth terminal>the positional information of the wireless LAN access point>GPS positional information when at least two of a set of the GPS positional information and the corresponding information leakage risk information, a set of the positional information and the information leakage risk information of the wireless LAN access point, and a set of the positional information and the information leakage risk information of the Bluetooth terminal are stored in the terminal positional information storage unit for the same communication terminal.

7. A communication method implemented in a communication system that includes a call management server connected to a communication network, a plurality of communication terminals configured to make communication with one another through the call management server, the communication terminals being connected to the communication network, and a positional information server connected to the communication network, the communication method comprising:
- updating positional information and information leakage risk information of a communication terminal stored in a terminal positional information storage unit of the positional information in accordance with a position of the communication terminal;
- transmitting the updated latest positional information and the updated latest information leakage risk information together with corresponding communication terminal information to the call management server;
- updating the positional information and the information leakage risk information of the communication terminal stored in a terminal status storage unit of the call management server when receiving the positional information and the information leakage risk information together with the communication terminal information from the positional information server;
- transmitting a list containing at least the terminal name, the latest positional information, and the latest information leakage risk information of each of the communication terminals capable of joining communication to a communication terminal as a communication source when receiving a list request from the communication terminal as the communication source; and
- displaying, in the communication terminal as the communication source, the received list in a different display manner of the positional information in accordance with the information leakage risk information.

8. A non-transitory computer-readable storage medium with an executable program stored thereon and executed by a computer of a communication system that includes a call management server connected to a communication network, a plurality of communication terminals configured to make communication with one another through the call management server, the communication terminals being connected to the communication network, and a positional information server connected to the communication network, wherein the program instructs the computer to perform:
- updating positional information and information leakage risk information of a communication terminal stored in a terminal positional information storage unit of the positional information in accordance with a position of the communication terminal;
- transmitting the updated latest positional information and the updated latest information leakage risk information together with corresponding communication terminal information to the call management server;
- updating the positional information and the information leakage risk information of the communication terminal stored in a terminal status storage unit of the call management server when receiving the positional information and the information leakage risk information together with the communication terminal information from the positional information server;
- transmitting a list containing at least the terminal name, the latest positional information, and the latest information leakage risk information of each of the communication terminals capable of joining communication to a communication terminal as a communication source when receiving a list request from the communication terminal as the communication source; and
- displaying, in the communication terminal as the communication source, the received list in a different display manner of the positional information in accordance with the information leakage risk information.

* * * * *